(12) United States Patent
Izumi

(10) Patent No.: US 7,835,072 B2
(45) Date of Patent: Nov. 16, 2010

(54) FAR-INFRARED CAMERA LENS, LENS UNIT, AND IMAGING APPARATUS

(75) Inventor: Tatsuya Izumi, Osaka (JP)

(73) Assignee: Sumitomo Electric Industries, Ltd., Osaka-shi (JP)

(*) Notice: Subject to any disclaimer, the term of this patent is extended or adjusted under 35 U.S.C. 154(b) by 346 days.

(21) Appl. No.: 12/076,343

(22) Filed: Mar. 17, 2008

(65) Prior Publication Data
US 2009/0067041 A1  Mar. 12, 2009

(30) Foreign Application Priority Data
Sep. 10, 2007 (JP) .............................. 2007-233509

(51) Int. Cl.
*G02B 13/14* (2006.01)
(52) U.S. Cl. ....................... 359/356; 359/784
(58) Field of Classification Search .............. 359/356, 359/357, 784, 785
See application file for complete search history.

(56) References Cited

U.S. PATENT DOCUMENTS

| | | | | |
|---|---|---|---|---|
| 5,973,827 | A * | 10/1999 | Chipper | 359/356 |
| 6,040,943 | A * | 3/2000 | Schaub | 359/565 |
| 6,111,689 | A | 8/2000 | Shibata | |
| 6,507,432 | B1 * | 1/2003 | Watanabe | 359/356 |
| 6,999,243 | B2 * | 2/2006 | Chipper | 359/690 |
| 7,184,225 | B1 * | 2/2007 | Noda | 359/784 |
| 7,212,354 | B2 * | 5/2007 | Sun | 359/784 |
| 7,362,518 | B2 * | 4/2008 | Sun | 359/753 |
| 7,394,602 | B2 * | 7/2008 | Chen et al. | 359/785 |
| 7,468,847 | B2 * | 12/2008 | Tang | 359/785 |
| 7,477,461 | B2 * | 1/2009 | Bareau et al. | 359/785 |
| 7,515,358 | B2 * | 4/2009 | Noda | 359/785 |
| 2003/0169491 | A1 * | 9/2003 | Bender et al. | 359/356 |

FOREIGN PATENT DOCUMENTS

| | | |
|---|---|---|
| EP | 0 950 904 A1 | 10/1999 |
| JP | 11-052227 | 2/1999 |
| JP | 11-295501 A | 10/1999 |
| JP | 2000-019392 | 1/2000 |
| JP | 2003-295052 A | 10/2003 |
| JP | 2004-240063 | 8/2004 |
| JP | 2007-114545 | 5/2007 |
| JP | 2007-199573 | 8/2007 |
| WO | WO 03/055826 A1 | 7/2003 |
| WO | WO-2007/086178 | 8/2007 |

* cited by examiner

*Primary Examiner*—Frank G Font
(74) *Attorney, Agent, or Firm*—Venable LLP; Michael A. Sartori; Steven J. Schwarz

(57) ABSTRACT

Three lenses formed of ZnS are used in combination. A first lens is a meniscus lens having a middle portion which is convex on an object side. A second lens has a middle portion that is a meniscus, which is concave on an object side and has positive refractive power, and a peripheral portion, which is convex on the object side. The first and second lenses have positive refractive power in combination. A third lens is provided adjacent to the second lens with a distance therebetween 1 mm or less and has a middle portion, which is a convex meniscus on an object side, and a peripheral portion which is concave on the object side. A diffraction surface is formed in either surface of the lens.

9 Claims, 14 Drawing Sheets f12 / f = 1.23   f = 8.48mm   f12 = 10.46mm
F VALUE: 0.94   MAXIMUM DIAMETER: 9mm   DISTORTION: -5.13%

MTF

MTF

FAR-INFRARED CAMERA LENS, LENS UNIT, AND IMAGING APPARATUS

BACKGROUND OF THE INVENTION

The present invention relates to a far-infrared camera lens having a wide angle and a lens unit and an imaging apparatus using the same. A far-infrared ray is light in a wavelength range of 8 μm to 12 μm, which includes a wavelength range of far-infrared rays that human beings emit. The wavelength range of far-infrared rays is much longer than a wavelength range for optical communication. A far-infrared camera is a camera that can sense an infrared ray, which is emitted from a human being or an animal, and can image the human being or the animal at night. In order to make it safer to drive an automobile at night, it is desirable to quickly and accurately recognize a human being or an animal that is present ahead.

A current automobile illuminates a front side with a head lamp such that a driver recognizes images, such as a street, a vehicle, a person, and a physical body, existing ahead by means of reflected light. This is front recognition using visible reflected light. However, a distant place or a side where light emitted from a lamp does not reach cannot be viewed in case of the method using visible reflected light. This is complemented by a far-infrared camera.

The body temperature of a human being or an animal is about 310 K, and a peak wavelength of black-body radiation at 310 K is about 8 μm to 12 μm. Accordingly, existence of a human being can be recognized by catching a far-infrared ray, which is emitted from a human being or an animal, using a far-infrared camera. A distant place other than a radiation range of a lamp can also be viewed because the far-infrared ray is not reflected light of the lamp. If an apparatus in which a far-infrared camera and an image processing system are combined is provided in an automobile, a human being or an animal that is present far away can be recognized early. Then, safety in driving an automobile at night will be improved.

It is preferable that a far-infrared camera for night observation be provided in an automobile. The far-infrared camera for night observation is not widespread even though the far-infrared camera for night observation is adopted in some automobiles. In order to make it possible, there are various difficulties to be solved. One of the difficulties is that the far-infrared camera is very expensive. In addition, another difficulty is that the resolution is not still sufficient. Thus, there is a problem that an optical system is defective. Furthermore, there is no light receiving elements which are cheap and suitable.

Since a far-infrared ray has low energy, it is not possible to detect the far-infrared ray by using a normal photodiode which uses a substrate, which is formed of Si, GaAs, InP, or the like having a wide band gap. Since the far-infrared ray has low energy, the ray can be received when PN junction is made with a semiconductor having a narrow band gap. However, since far-infrared energy is about a room temperature, the far-infrared ray cannot be detected when a light receiving element is at a room temperature. It is difficult to use the light receiving element for a vehicle if the light receiving element is not extremely cooled.

Therefore, for example, a thermopile detector, an SOI (silicon on insulator) diode, or a bolometer having sensitivity in a range of 8 to 12 μm is used as an imaging device of a far-infrared camera. Those described above are not light receiving elements having PN junction but elements which convert heat into electricity and non-cooled-type imaging devices. Currently, an imaging device having the number of pixels of 160×120 or 320×240 is used.

Here, discussion will be focused on an optical system. There is one problem in a lens material used to condense far-infrared rays. Germanium (Ge) is a material allowing an infrared ray to satisfactorily pass therethrough. Since germanium is a material allowing an infrared ray to satisfactorily pass therethrough and has a high refractive index (about 4 in the case of a far-infrared ray), germanium is an excellent infrared material. The transmittance of a far-infrared ray having a wavelength of 10 m with respect to Ge is about 40 to 45%. However, in the case where antireflection coating is properly performed, the transmittance is about 90 to 98%.

However, Ge is a rare mineral the output of which is low. Ge is a limited natural resource and is very expensive. In addition, Ge is very hard. In order to manufacture a lens, it is necessary to first make the form of the lens by cutting a large Ge lump and then make a surface smooth by grinding. This is a work that is performed over a long period of time using precise equipment. Since Ge is hard, a tool is also special. In the case when a Ge lens is used, a price is increased. It is difficult that an expensive far-infrared camera is widespread.

Chalcogenide glass is also known as a material of an infrared lens. Chalcogenide glass is glass containing chalcogen, such as chlorine, bromine, and iodine, and germanium. Since there is little absorption of infrared rays in the chalcogenide glass, the chalcogenide glass may be used for the infrared lens. Since the chalcogenide glass can be liquefied by heating, the chalcogenide glass can be molded in accordance with the shape of a mold. However, since the chalcogenide glass also contains germanium as a principal component, material cost increases.

There is ZnSe as a material not containing Ge. ZnSe can be polycrystallized by using a CVD method, and then a lens can be obtained by scraping the polycrystalline ZnSe. In the same manner as Ge, it takes cost to cut and grind the ZnSe.

In order that a far-infrared camera is widely mounted in an automobile, it is necessary to manufacture the far-infrared camera at low cost. Therefore, it is necessary to develop a sensor capable of efficiently sensing far-infrared rays in a range of 8 μm to 12 μm and to manufacture a lens optical system at low cost. As described above, a best material for a far-infrared ray is germanium. However, germanium is an expensive material. Accordingly, as long as Ge is used, an inexpensive far-infrared camera cannot be made. Although the chalcogenide glass is also a next candidate, it is not possible to reduce the cost because the chalcogenide glass also contains a large amount of germanium. The ZnSe is also a candidate for infrared rays, but the ZeSe is not suitable as a camera lens because absorption of far-infrared rays is large.

Next, ZnS (zinc sulfide) is considered as a candidate. This is an inexpensive material. The far-infrared ray transmittance of ZnS is lower than that of germanium and far-infrared ray absorption of ZnS is larger than that of germanium. The transmittance at a wavelength of 10 μm is about 70 to 75%. In the case where antireflection coating is properly performed, the transmittance is about 85 to 90%. A refractive index of ZnS is lower than that of germanium. For this reason, ZnS is inferior to germanium in terms of properties as a lens. Moreover, it is also difficult to work with the ZnS. Currently, it may be possible to polycrystallize ZnS with a CVD method, to cut the polycrystalline ZnS in a cylindrical convex shape or a cylindrical concave shape, and to grind the polycrystalline ZnS so as to finally make a surface thereof smooth. However, since the ZnS is also a hard material, it takes cost to cut and grind the ZnS. For these reasons, there has been no infrared optical system realized by using a ZnS lens.

However, there are some proposals of far-infrared lenses using ZnS lenses. Patent Document 1 proposes a method of manufacturing a ZnS lens using a sintering process. In this case, ZnS powder is molded by hot compression using a lens-shaped mold.

Patent Document 2 proposes a method of manufacturing a lens as a polycrystalline ZnS sintered compact by molding ZnS by hot compression in a temperature range of 900° C. to 1000° C. and under the pressure of 150 to 800 kg/cm$^2$.

[Patent Document 1] WO2003/055826

[Patent Document 2] JP-A-11-295501

One of the useful applications of a far-infrared camera is a night vision system which helps an automobile driver to perceive a pedestrian. This is a night-time pedestrian detection system using a far-infrared camera. Since a human being or an animal has considerably high body temperature, the human being or the animal emits infrared rays in a wavelength range of 8 μm to 12 μm. Existence of a human being or an animal in the street can be detected at night by using a camera that senses an infrared ray in the above wavelength range. Since it is not detection of reflected light, it is possible to detect a human being or an animal present in a distant place or an inclined portion where light of a lamp does not reach. It is expected, in an automobile running at high speed, to detect the existence of a human being or an animal positioned at a corner of a field of view that cannot be sufficiently viewed by reflected light of a head lamp. Accordingly, it is very preferable to have a wide angle. In addition, in order to distinguish between a human being and an object body, high resolution is requested. Moreover, in the case of a system for a vehicle, the system should be small since there is no sufficient space in the vehicle. In addition, the system should be cheap in order to be used for the vehicle. A wide-angle camera lens can be formed by using a number of lenses in combination. In the case of a far-infrared ray, many Ge lenses with little absorption may be used in combination. However, since a large amount of expensive material is used, the price becomes so high. For cost reduction, a small number of lenses formed of a far-infrared material other than Ge are used.

SUMMARY OF THE INVENTION

It is a primary object of the invention to provide an infrared camera lens which uses ZnS as a material, has a wide field of view, and is small and cheap. More specifically, it is an object of the invention to provide an infrared camera lens having a wide angle of 50°-70° as a viewing angle.

In order to make a wide-angle lens in a condition of low cost and small size, the invention constitutes an optical system using three ZnS lenses. Since far-infrared ray absorption of ZnS is large, the amount of transmitted light is decreased if a number of lenses are used so as to overlap one another. In cases of one lens and two lenses, an aberration is suppressed. Accordingly, a wide-angle lens cannot be obtained by one lens and two lenses. For this reason, the invention is limited to three lenses.

Infrared lens of the invention are formed of ZnS and include: a first lens which is convex on an object side and concave on an image surface side in the vicinity of the middle and which is concave on the object side and convex on the image surface side in a peripheral portion thereof; a second lens which is concave on an object side in the vicinity of the middle and is convex and has positive refractive power on an image surface side in the vicinity of the middle and which is concave on the object side in a peripheral portion thereof; and a third lens which is convex on an object side and concave on an image surface side in the vicinity of the middle and which is concave on the object side and convex on the image surface side in a peripheral portion thereof. Some lenses are made to have aspheric surfaces, and at least one surface is a diffraction surface. The second and third lenses are provided such that middle portions thereof are close to each other by 1 mm or less. The aspheric surface and the diffraction surface are provided to suppress various kinds of aberrations.

A lens unit may be obtained by combination of those lenses. Moreover, an imaging apparatus (infrared camera) provided with the lens unit and an imaging unit, which images an image formed on the lenses, may also be obtained.

A wide angle means that a light beam having a wide incidence angle is also refracted inward. Therefore, an effective diameter of the second lens is larger than that of the first lens. In the case where the refractive power of the first and second lenses is sufficiently large, the refractive power of the third lens may be small in some degree. The refractive power of the third lens may be slightly negative in some cases. In the case where the refractive power of the first and second lenses is small, the refractive power of the third lens should be large. If the diameter of a lens is large, it is possible to make a focal distance long and to easily increase the resolution. However, in the case of an infrared camera for a vehicle, the size is restricted. This is because a mounting place is limited and low cost is desirable.

The diameter of a lens and the diameter of a sensor are slightly different, but they are almost the same. Since an image is formed on a sensor, an effective diameter D of a sensor is a problem. The focal distance of the entire lens is set to f. Since an aspheric surface is used, the focal distance cannot be defined in a strict sense of meaning. The focal distance is defined only for paraxial rays. A maximum incidence angle of a light beam which can be imaged in a sensor is assumed to be Θ. A viewing angle Y is twice the maximum incidence angle. Then, between the effective dimension D and the viewing angle of the sensor, the approximate relationship of D=2 ftan Θ is obtained. A wide angle means that Θ is large. Assuming that a viewing angle Y is set to 50° to 70°, the maximum incidence angle Θ is about 25° to 35°. This limits a range of the entire focal distance f. The relationship of f=D/2 ftan Θ is a reference.

The resolution is determined on the basis of the pixel number of a sensor. A pixel pitch depends on a technology of manufacturing a far-infrared sensor, and a pixel having 25 μm square can be currently formed. Although the resolution may be increased by making the diameter D of a sensor large, the diameter (lens diameter+thickness of a tube) of the entire camera cannot be made too large as described above. For example, it is assumed that the diameter D of a sensor is about 9 mm. Assuming that the maximum incidence angle is 25°, f is about 10 mm. If the maximum incidence angle Θ is set to 35°, f is about 6 mm. Assuming that the diameter of a sensor is D=10 mm, f is about 11 mm in the case of the maximum incidence angle Θ=25° and f is about 7 mm in the case of the maximum incidence angle Θ=35°. Therefore, assuming that the size of a sensor is 9 to 10 mm, the total focal distance f is about 6 mm to 11 mm in the case of an incidence angle of 25° to 35° (viewing angle of 50° to 70°) If the size of a camera is set to be larger, f is also increased corresponding to the size.

Since a wide-angle camera is targeted, a composite focal distance $f_{12}$ of the first and second lenses should also be sufficiently small. This is because a light beam having a large incidence angle needs to be bent inward by means of the first and second lenses. The first lens is a meniscus lens which is convex on an object side. A surface S1 is convex in a middle portion, but a concave surface needs to be formed in a part of a peripheral portion in order to obtain a wide angle. That is because it is necessary to spread light beams having a wide incidence angle, which are incident on the peripheral portion. In the second lens, a middle portion of a front surface S3 is concave such that light beams are spread. However, in a peripheral portion of the front surface S3, a part of the peripheral portion needs to be a convex surface in order to condense the light beams that are spread.

$f_{12}$ is a value that is almost equal to the total focal distance f. However, $f_{12}$ may be slightly shorter than f or may be longer than f. A focal distance $f_3$ of the third lens changes with $f_{12}$. In the case where D is 9 to 10 mm as described above, a range of the total focal distance f is determined to be 6 to 11 mm. In order to obtain sufficient refractive power for inward refraction, preferably, the third lens is arranged to be so adjacent to the second lens to be almost in contact with the second lens. In this case, even if the refractive power $1/f_3$ of the third lens is quite small, it is possible to cause light beams to converge. When $1/f_{12}$ is sufficiently large, $1/f_3$ may be slightly negative. In addition, a lower limit of $f_{12}/f$ is about 0.9. This is a case in which the first and second lenses have positive refractive power and are arranged to be adjacent to each other. In this case, $1/f_3$ may also be negative. Since the third lens serves to make spreading light beams converge on an image surface, the third lens is a convex meniscus lens on the object side. In the case where $1/f_{12}$ is small, $1/f_3$ should be large in positive. In this manner, the total refractive power $1/f$ is increased. An upper limit of $f_{12}/f$ is about 1.6. Consequently, there is a limit of $0.9 \leq f_{12}/f \leq 1.6$. Since D is small at a wide angle, both f and $f_{12}$ are small values. $f_{12}$ is about 5 mm to 18 mm.

In order to obtain a wide angle, it is necessary to increase especially the refractive power $1/f$ or $1/f_{12}$. Therefore, it is difficult to increase the refractive power only with a spherical surface. Moreover, operations with respect to central light and ambient light are different even in the same lens, the increase in refractive power cannot be realized only with a spherical surface. For this reason, at least one surface of each of the first, second, and third lenses is an aspheric surface. In the case of a wide angle, a spherical aberration and astigmatism appear strongly. In the case of having only a spherical surface, it is difficult to correct the spherical aberration and the astigmatism, and accordingly, it is necessary to provide an aspheric surface. In the case of ZnS, a chromatic aberration is large, and accordingly, correction should be made. In the invention, a surface of a lens is used as a diffraction surface. Due to the diffraction surface, the chromatic aberration can be satisfactorily corrected. In addition, the diffraction surface is also useful for correction of a spherical aberration.

The first to third lenses made of ZnS are formed by molding. Therefore, manufacturing cost can be reduced compared with a case where the lenses are manufactured by cutting.

Furthermore, in the invention, a ZnS lens is manufactured by molding ZnS raw powder by hot compression in a high temperature and high pressure condition using a lens-shaped mold. Accordingly, predetermined limitation is applied to the shape of a lens. In order to secure sufficient moldability (mechanical strength, machining precision) in a high temperature and high pressure condition, the lens thickness is preferably large to some degree. On the other hand, absorption is also increased if the thickness is too large, which is not preferable. Since absorption of ZnS is larger than Ge in a range of 8 to 12 μm, the thickness of a lens is preferably 8 mm or less. Although the thickness of a lens changes with the position because a lens surface is irregular, limitation of the thickness is expressed by using the central thickness and the thickness (this is called edge thickness) of a peripheral portion. Since a middle portion has a middle value, the thickness range can be thus expressed.

In the case of a high-resolution lens system targeted for an imaging device having a pixel pitch of 25 μm, for example, a ZnS lens of the invention satisfies the following conditions in consideration of moldability and transparency.

1.5 mm<central thickness<8.0 mm
1.0 mm<edge thickness<8.0 mm

In order to secure moldability (mechanical strength, machining precision) in molding under a high temperature and high pressure condition, the curvature of a lens is preferably small. The reciprocal of a radius of curvature R of a lens is a curvature. In the case of a spherical lens, the curvature is large since aperture is small and a focal distance is short. A difference between heights of lens surfaces in the center and an edge is called a sag amount. If the sag amount is large, it is difficult to manufacture a lens on the basis of molding in a high temperature and high pressure condition. In the invention, the sag amount of ZnS lens is set to be less than 5 mm (sag amount<5 mm).

That is, in the case of the far-infrared lens of the invention, the first to third lenses are made to satisfy the following conditions.

First lens: meniscus lens which is convex on an object side in a middle portion and which is concave on the object side in a peripheral portion Second lens: meniscus lens which is concave on an object side in a middle portion and which is convex on the object side in a peripheral portion Third lens: meniscus lens which is convex on an object side in a middle portion and which is concave on the object side in a peripheral portion An aspheric surface and a diffraction surface are provided to suppress a spherical aberration and astigmatism.

6 mm $\leq$ f $\leq$ 11 mm
5 mm $\leq f_{12} \leq$ 18 mm
$0.9 \leq f_{12}/f \leq 1.6$
1.5 mm<central thickness<8.0 mm
1.0 mm<edge thickness<8.0 mm
Sag amount<5 mm The composite focal distance $f_{12}$ of the first and second lenses should also be short. If the composite focal distance is short, the refractive power $1/f_3$ of the third lens may be small. The refractive power $1/f_3$ may also be slightly negative. However, since the third lens serves to make spreading light beams converge on an image surface, the third lens is not allowed to have too large negative refractive power. For this reason, the lower limit of $f_{12}/f$ is set to 0.9. In case where f12 is long, that is, the refractive power of the first and second lenses is not sufficient, it is necessary to cause light beams to converge with the third lens. In that case, the third lens is a lens with large refractive power. For this reason, the upper limit of $f_{12}/f$ is set to 1.6. Since the total focal distance f is originally short, $f_{12}$ is also short. In case where the diameter D of a lens or a sensor is 9 to 10 mm, $f_{12}$ is about 5 mm to 18 mm.

The first, second, and third lenses have different refractive power with respect to light beams passing through the vicinity of the middle (paraxial rays) and light beams passing through the periphery. For this reason, a wide angle is obtained. The concavo-convex relationships in the periphery and the middle of a lens change. This cannot be realized with a spherical lens, and accordingly, an aspheric surface is used. It cost a lot to manufacture an aspheric surface by cutting. However, in the invention, the aspheric surface is obtained by molding using a lens-shaped mold. As a result, even in the case of an aspheric surface, cost is not increased.

Wavelength dispersion of ZnS is larger than that of Ge. Normally, a chromatic aberration occurs in a ZnS lens, which deteriorates a performance of the ZnS lens. Accordingly, in the invention, a diffraction surface is used to reduce the chromatic aberration. In addition, the diffraction surface also largely contributes to correction of a spherical aberration.

The far-infrared camera lens of the invention can have a wide angle of 50° to 70° as a viewing angle. An F value is about 0.8 to 1.2. Since the lens is manufactured by using cheap ZnS instead of expensive Ge, material cost can be reduced. However, even if the ZnS is used, it takes time and cost to manufacture the lens by cutting. In this case, low-cost manufacturing is not possible. In the invention, a ZnS lens is manufactured by performing hot compression molding (performing molding) of ZnS raw powder using a lens-shaped mold, such that low-cost manufacturing is realized. Since there is absorption in ZnS, the brightness of a lens cannot be discussed only with an F value. In order to reduce the absorption, it is necessary to reduce the total thickness of a lens. Since three lenses, each of which has a small diameter and a small thickness, are used in the invention, the absorption is also small.

In the invention, an optical system can be realized at low cost by making a design satisfying the shape (maximum diameter, lens thickness) suitable for pressure and temperature conditions at the time of molding disclosed in JP-A-11-295501.

In order to secure moldability (mechanical strength, machining precision) in molding under a high temperature and high pressure condition, the lens thickness is preferably large to some degree. However, since absorption is large in the case of ZnS, the transmittance of a lens is reduced if the lens thickness is large. The thickness needs to be determined in consideration of trade-off between moldability and transmittance.

For example, in the case of a high-resolution lens system targeted for an imaging device having a pixel pitch of 25 μm, the invention is designed such that conditions of 1.5 mm<central thickness<8.0 mm, 1.0 mm<edge thickness<8.0 mm, and sag amount<5 mm are satisfied. Thus, both the moldability and the transmittance are satisfied.

One of the applications of a far-infrared camera using the ZnS lens of the invention is a night vision system. This is a night-time pedestrian detection system mounted in an automobile. A pedestrian in the street is detected by sensing a far-infrared ray generated due to the body temperature of a human being. A far-infrared camera lens for a vehicle is strongly requested to have high resolution and be small from demands of an improvement in precision of image recognition, easy mounting of a camera in a vehicle, and the like.

Usually, a far-infrared camera is provided, for example, at a front grille or the periphery of a bumper under severe environment, which is exposed to wind and rain or collides with a flying object while driving. Accordingly, environmentally resistant measures, such as measures against damage or contamination of a lens, are important.

There are cooled-type and non-cooled-type infrared sensors. For the far-infrared camera of the invention, a non-cooled-type thermal imaging device, such as a bolometer, a thermopile detector, or an SOI diode, having sensitivity in a range of 8 to 12 μm is used as a sensor.

Typically, an imaging device having the number of pixels of 160×120 or 320×240 is used as the non-cooled-type thermal imaging device. Since the imaging device is a thermal sensor, it is not possible to make the size of a pixel too small. However, a pixel having a pitch of 25 μm, for example, can be made even now. If a pixel of 25 μm×25 μm is used, the effective area of a sensor having the pixel number described above is 4 mm×3 mm or 8 mm×6 mm. As a result, it is possible to make an image surface small. The lens diameter can be made small if the image surface is small. If the lens diameter is small, the entire camera can be made smaller.

A high-resolution lens excellent in optical performances (brightness, frequency resolution, and temperature resolution) can be manufactured by forming an aspheric surface or a diffraction surface on a surface of a lens without increasing the number of lenses and the lens size. This makes application to image recognition processing easy. As a lens, a lens having a viewing angle of about 50° to 70° and an F value of about 0.8 to 1.2 is used.

Since a far-infrared lens is manufactured by performing hot compression molding (performing molding) of ZnS raw powder using a lens-shaped mold, material cost and machining cost can be reduced. As a result, the lens can be manufactured at low cost.

An outermost surface of a lens (object side surface of the first lens) exposed to rain, gas, dirt, and the like is preferably coated with a super hard film, such as a DLC coat. Then, the surface strength is increased, and accordingly, environmental resistance is also increased.

The invention is very useful for in-vehicle applications, such as a lens for an in-vehicle far-infrared camera. In addition, the invention is also useful for applications other than the in-vehicle applications. By performing DLC coat processing on an outermost surface of a lens exposed to the outside environment, the lens is not damaged and dirt is easily removed. Accordingly, the lens is also effective as a lens for a surveillance camera installed in a place where maintenance is not easy.

Since the lens is suitable for detection of a heat emitting body, such as a human being, which emits far-infrared rays, the lens may be used as effective means for rescue activities. In addition, the lens is also useful as a camera lens used to search for a victim under a severe environment such as a mountain or the sea.

In addition, since far-infrared rays which are not visible light are detected, it is possible to precisely detect the location of a human being, which is left indoors, in a fire place full of smoke and having poor field of view. In addition, fire fighting can be quickly and precisely performed by finding a hot spot in a wall or a roof (heat source) in a fire place. The invention may also be applied for thermal image analyses, such as processing for remaining fire.

In the case of an infrared camera lens for improving the safety in driving an automobile at night, the infrared camera lens is requested to be cheap and small and has a wide angle. In the invention, a ZnS lens is used to reduce cost. Since ZnS is a hard material, it costs a lot to perform a cutting process. However, the ZnS lens may be manufactured at low cost by putting material powder into a lens-shaped mold and performing compression molding in a high temperature and high pressure condition. Since the lens is manufactured by using a mold, it is also easy to form an aspheric surface or a diffraction surface. However, since the ZnS has large absorptivity, the thickness of the entire lens should be as small as possible. A wide angle can be obtained by overlapping several lenses each having a large diameter. However, as the diameter of a lens increases, the thickness thereof also increases. If the total thickness of lenses increases, absorption increases in the case of ZnS, which does not allow the lenses to function as a lens system.

For this reason, it is not possible to make the diameter of the ZnS lens too large. In addition, it is preferable that the number of lenses is small. Therefore, in the invention, a three-lens system is adopted. Although there are various wide angles, a viewing angle of 50° to 70° is herein targeted. Assuming that the effective diameter of a lens/sensor is about 9 mm to 10 mm, the entire focal distance f is about 6 mm to 11 mm.

In the invention, three ZnS lenses are used in combination. The three ZnS lenses are: a first lens having a middle portion that is a meniscus, which is convex on an object side and concave on an image surface side, and a peripheral portion, which is concave on the object side and convex on the image surface side; a second lens having a middle portion, which is a concave positive meniscus on an object side, and a peripheral portion, which is convex on the object side; and a third lens having a middle portion, which is a convex meniscus on an object side, and a peripheral portion, which is concave. The first lens may have positive and negative refractive power. The composite refractive power of the first and second lenses is positive. Light beams, which are highly inclined, incident on the lens periphery are refracted toward the middle by the second lens. The effective diameter of the second lens is larger than that of the first lens. The third lens is a convex meniscus lens on the object side in the middle portion thereof and is provided so as to almost come in contact with the second lens. This is to effectively use the refractive power of the third lens.

DETAILED DESCRIPTION OF THE PREFERRED EMBODIMENTS

First Embodiment

Figure 1:
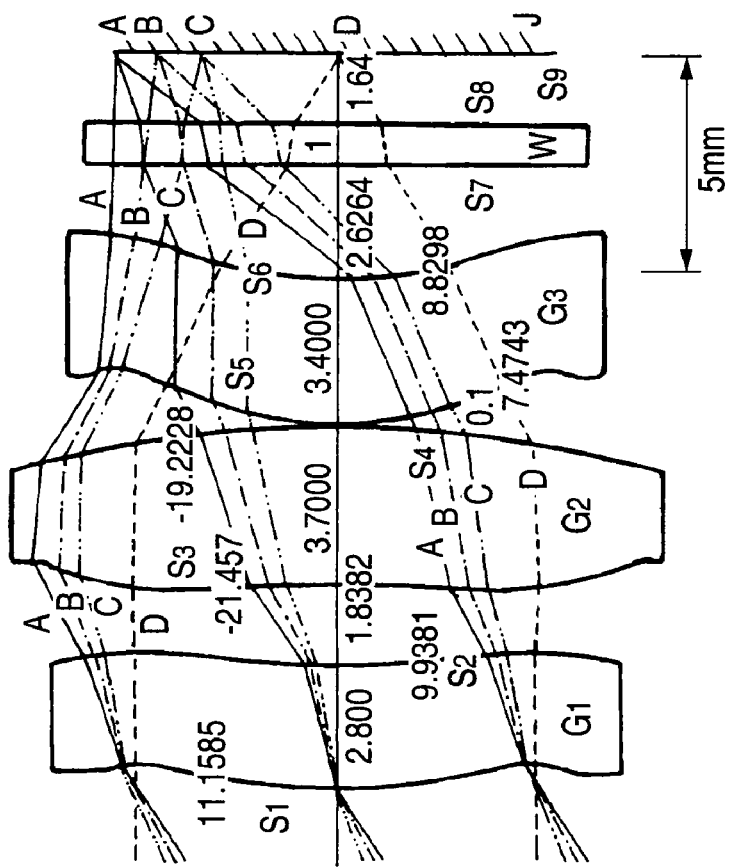
FIG. 1 is a cross-sectional view illustrating a far-infrared camera lens according to a first embodiment of the invention that is configured to include three lenses of: a first lens G1 having a middle portion, which is convex on an object side and concave on an image surface side, and a peripheral portion, which is concave on the object side and convex on the image surface side; a second lens G2 having a middle portion, which is concave on an object side and concave on an image surface side, and a peripheral portion, which is convex on the object side and has a positive refractive power; and a third lens G3 having a middle portion, which is convex on an object side and concave on an image surface side, and a peripheral portion, which is concave on the object side and convex on the image surface side.
Figure 2:
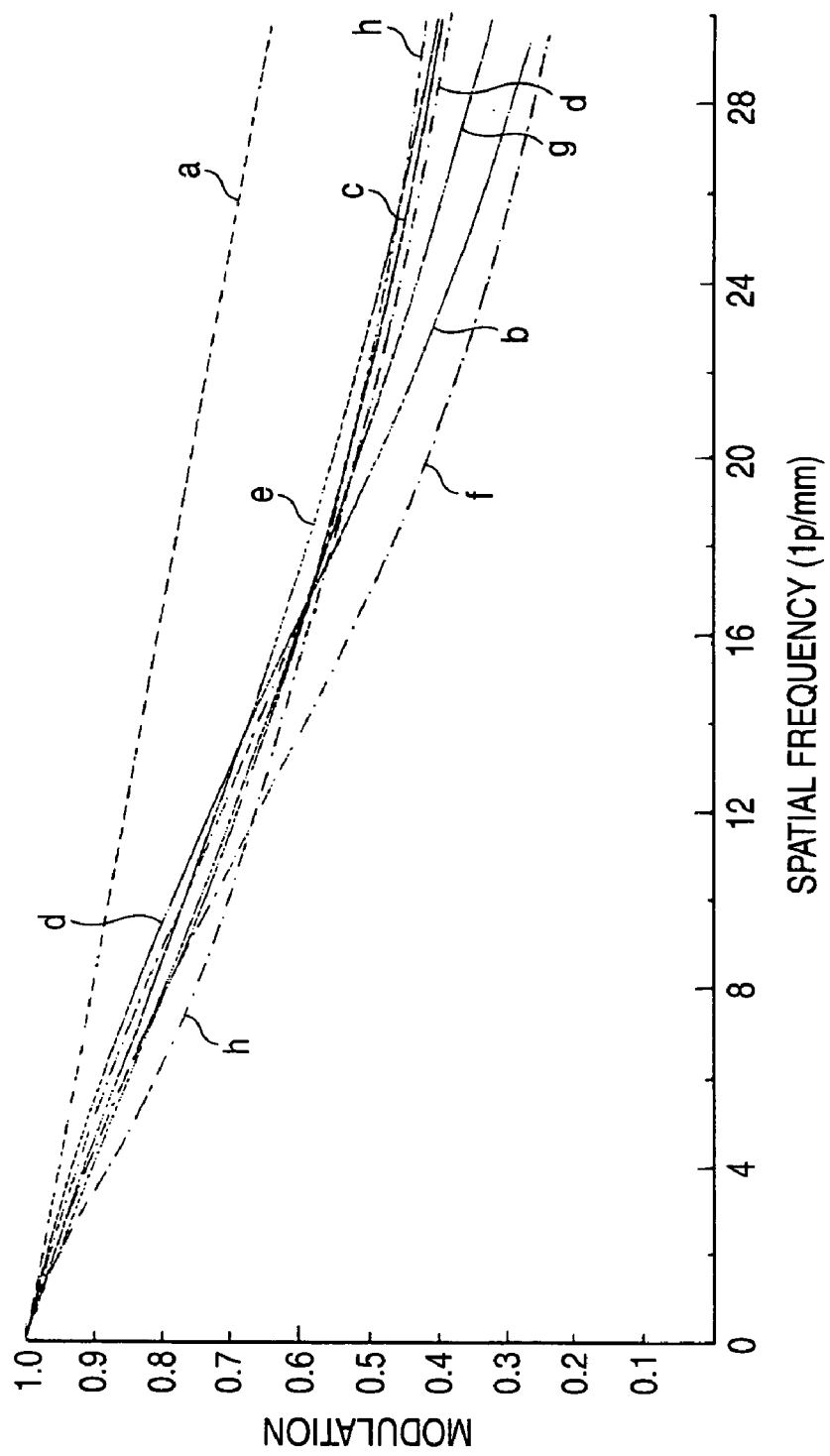
FIG. 2 is a graph illustrating an MTF curve when a spatial frequency of the far-infrared camera lens according to the first embodiment is on a horizontal axis, modulation is on a vertical axis, and an incidence angle is a parameter.

FIGS. 1 and 2

ZnS, a set of three lenses (G1, G2, G3)
$f_{12}/f=1.23$
$f=8.48$ mm
$f_{12}=10.46$ mm
F value 0.94
Maximum diameter 9 mm
distortion −5.13%
Viewing angle 64.2°

In a first embodiment, a viewing angle is 64.2° and $f_{12}/f$ is 1.23. $f_{12}$ is a composite focal distance of G1 and G2, and f is a total focal distance. Although an explanation has been already made repeatedly, the focal distance f cannot be defined as a whole because the lenses are aspheric lenses. The focal distance f is a value defined for a light beam passing along the locus near a central axis. The same is true for $f_{12}$. The F value of a lens is f/D obtained by dividing the focal distance f by an effective diameter D.

FIG. 1 illustrates a cross section of a lens system according to the first embodiment. This is configured to include three lenses. The three lenses are set to G1, G2, and G3 from an object side. The three lenses are all formed of ZnS. A powder material of ZnS is put into a lens-shaped mold and is then molded in a high temperature and high pressure condition. A flat member corresponding to a fourth sheet is a window W of a sensor. The sensor window W is provided in a sensor and is formed of Ge. A shutter (not shown) is provided between the last lens G3 and the window W. A sensor surface (image surface; image formed surface) J is positioned behind the sensor window W.

The first lens G1, which is an objective lens, has positive refractive power and is a meniscus lens having a middle portion, which is convex on an object side and concave on an image surface side. Since the first lens G1 has an aspheric surface, the first lens G1 does not have a uniform curvature and has a concave surface on an object side and a convex surface on an image surface side in a peripheral portion. The second (middle) lens G2 has a concave surface on an object side and a convex surface on an image surface side in a middle portion thereof. The second lens G2 is formed to have an aspheric surface and is complicated, and a peripheral portion of the second lens G2 has a convex surface. The third lens G3 has a convex surface on an object side and a concave surface on an image surface side in a middle portion thereof. The third lens G3 does not have a uniform curvature. In a peripheral portion of the third lens G3, there is a concave portion on an object side and a convex portion on an image surface side. The outline of the characteristics of the lenses is shown in Table 1.

TABLE 1

| Lens | Surface | Surface type | Radius of curvature(mm) | Surface gap | Aperture radius(mm) |
|---|---|---|---|---|---|
| Object | | | | infinite | |
| G1 Lens | S1 | Aspheric surface | 11.1585 | 2.8000 | 4.5000 |
| | S2 | Aspheric surface | 9.9381 | 1.8382 | 5.6494 |
| G2 Lens | S3 | Aspheric surface | −21.4570 | 3.7000 | 6.7369 |
| | S4 | Aspheric surface | −19.2228 | 0.1000 | 6.5345 |
| G3 Lens | S5 | Aspheric surface | 7.4743 | 3.4000 | 5.2652 |
| | S6 | Aspheric surface | 8.8298 | 2.6264 | 4.9976 |
| Window | S7 | | infinite | 1.0000 | 4.9487 |
| | S8 | | infinite | 1.6400 | 4.9411 |
| Sensor | S9 | | infinite | | 5.0000 |

Surface numbers are given to both surfaces of the lenses in the order in a condition that an object placed at the infinity is set to 0. Surfaces of the first lens G1 are a surface S1 and a surface S2, surfaces of the second lens G2 are a surface S3 and a surface S4, and surfaces of the third lens G3 are a surface S5 and a surface S6. Surfaces of the sensor window W are flat surfaces, which are a surface S7 and a surface S8. The image surface J is a surface S9. Three sets of loci of light beams having different incidence angles are shown. FIG. 1 illustrates three kinds of light beams, including light beams passing through a topmost portion of the G1 lens, light beams passing through the middle of the G1 lens, and light beams passing through a lower portion of the G1 lens.

A light beam (A) having a most upward incidence angle is shown in a solid line. A light beam (B) having a second incidence angle is shown in a one-dotted chain line. A light beam (C) having a third largest incidence angle is shown in a double-dotted chain line. A light beam (D) having a fourth incidence angle is shown in a broken line. Although a number of parallel light beams having the same incidence angle pass through the first lens G1, the light beams converge on one point on the image surface J. Thus, the light beams can be represented as three kinds of light beams.

A surface gap means the thickness of a lens and a center-to-center gap between lenses. A distance between an object and the first lens G1 is infinite. The central thickness of the first lens G1 is 2.8000 mm. A center-to-center distance between opposite surfaces of the first and second lenses G1 and G2 is 1.8382 mm. The central thickness of the second lens G2 is 3.7000 mm. A center-to-center distance between opposite surfaces of the second and third lenses G2 and G3 is 0.1000 mm. The central thickness of the third lens G3 is 3.4000 mm. A distance between opposite surfaces of the third lens G3 and the window is 2.6264 mm. The thickness of the sensor window W is 1.0000 mm, and a distance between the sensor window and a sensor surface is 1.6400 mm.

An object of the invention is to provide a wide-angle lens. Since a signal of visible light based on reflected light of head lamp is to be complemented for a vehicle, it is preferable that even the appearance of an oblique-direction road where light from the head lamp does not reach can be detected. Accordingly, it is very preferable that a far-infrared camera have a wide angle. Irregularity of a lens surface is expressed as follows using a radius coordinate r.

$$Z(r) = (r^2/R)/[1 + \{1-(1+K)(r^2/R^2)\}^{1/2}] + A_2 r^2 + A_4 r^4 + A_6 r^6 + A_8 r^8 + \ldots + \phi(r) \quad (1)$$

$$\phi(r) = \{1/(n-1)\} \bmod(\Sigma C_j r^j, -\lambda) \quad (2)$$

Z(r) indicates the height of a lens surface at a point having r as a radius coordinate. It is promised that a case of protrusion toward an object side is 'negative' and a case of protrusion toward an image surface side is 'positive'. R is an amount corresponding to a radius of curvature in the case of a spherical lens. A radius of curvature of a curved surface, of which the center is positioned at an object side and an arc is positioned at an image surface side, is expressed as 'negative', and a radius of curvature of a curved surface, of which the center is positioned at an image surface side and an arc is positioned at an object side, is expressed as 'positive'. 'Positive' and 'negative' of R are defined such that concave and convex shapes of front and back surfaces of a lens are opposite to each other. K is an eccentricity.

$A_2$, $A_4$, $A_6$, ... are second-order, fourth-order, sixth-order, ... aspheric coefficients. This term may also be simply written as $\Sigma A_{2i} r^{2i}$. In case where a spherical lens is used, an aspheric coefficient is 0. When an aspheric lens is used, an aspheric coefficient is a value which is not 0. An aspheric surface is adopted in order to correct aberrations, such as astigmatism, a spherical aberration, and an image surface curvature. It is an object of the invention to provide a lens having a wide viewing angle. Since selection of an aspheric coefficient is not almost relevant to the size of a viewing angle, the selection of an aspheric coefficient is not described in detail.

$\phi(r)$ is a function which determines a diffraction surface.

$C_j$ is a j-th order diffraction coefficient. mod(p, q) is a remainder obtained by dividing p by q. That is, q is subtracted whenever p increases by q. A diffraction grating having a concentric ring structure with a height of q is made by deducting q when a curved surface is increased due to an increase in a radius r. Here, a function $C_1r+C_2r^2+C_3r^3+C_4r^4\ldots=\Sigma C_jr^j$ of height and the wavelength λ are compared and the wavelength λ is deducted as much as can be done, thereby obtaining the remainder (0<remainder<λ). Thus, the height of a concentric diffraction grating is determined as a function of the radius r. The diffraction height $\Sigma C_jr^j$ is compared with +λ when the diffraction height $\Sigma C_jr^j$ is positive, and the diffraction height $\Sigma C_jr^j$ is compared with −λ when the diffraction height $\Sigma C_jr^j$ is negative. In the case of ZnS, a chromatic aberration is large. The wavelength dependency of a refractive index and the wavelength dependency of diffraction are opposite to each other. A diffraction surface is used to suppress a chromatic aberration.

(Object Side Surface of G1: Surface S1)

The surface S1 of the first lens G1 is an aspheric surface which is convex on an object side and concave on an image surface side in the vicinity of the middle. The concave and convex shapes are not uniform, but a concave shape is formed on an object side in a peripheral portion and a convex shape is formed on an image surface side in the peripheral portion. Such shapes are formed to spread light beams incident on the peripheral portion at a wide angle. An aperture radius of the surface S1 is 4.5000 mm. An effective diameter is 9 mm.

Radius of curvature R=11.1585 mm

Eccentricity K=−1.1697

Aspheric coefficients are as follows.

$A_2=-7.8053\times10^{-3}\,\text{mm}^{-1}$ $A_4=-3.0937\times10^{-4}\,\text{mm}^{-3}$ $A_6=-1.3201\times10^{-6}\,\text{mm}^{-5}$ $A_8=-7.0032\times10^{-7}\,\text{mm}^{-7}$

C1=C2=C3=C4=...=0.

That is, there is no diffraction operation on the surface S1. The lens thickness of the first lens G1 is 2.8000 mm.

(Image-Surface-Side Surface of G1: Surface S2)

The surface S2 of the first lens G1 is a concave aspheric surface. An aperture radius is 5.6494 mm. An effective diameter is 11.2988 mm. In the case when a light beam, which is obliquely incident from the outside, is incident on the peripheral portion of the surface S1, the light beam should not leak. Accordingly, the aperture radius of the surface S2 is larger than that of the surface S1. The radius of curvature of the surface S2 is R=9.9381 mm. Since the radius of curvature R is defined as 'positive' in a case where the center is located on the right and a lens surface is located on the left, the surface S2 is a concave surface. The eccentricity is K=1.0541. Aspheric coefficients are as follows.

$A_2=-2.7253\times10^{-2}\,\text{mm}^{-1}$ $A_4=-1.8926\times10^{-4}\,\text{mm}^{-3}$ $A_6=-2.5012\times10^{-5}\,\text{mm}^{-5}$ $A_8=+6.9284\times10^{-3}\,\text{mm}^{-7}$ Aspheric coefficients having higher orders than those described above are 0. Diffraction coefficients are as follows.

$C_1=-1.3156\times10^{-3}$ $C_2=-4.3148\times10^{-5}\,\text{mm}^{-1}$

The first lens G1 has a convex surface on an object side and a concave surface on an image side in a middle portion thereof. The first lens G1 has a concave on the object side and a convex surface on the image side in the peripheral portion thereof. The reason why a convex surface is formed on the object side is to meet a wide angle. A convex surface is required to cause light beams to be satisfactorily incident on the lens G1 in a range of a wide incidence angle. Since the second lens G2 is separated from the first lens G1, it is difficult to spread light beams in the second lens G2 if the light beams are made to converge too much in the first lens G1. For this reason, the first lens G1 may have weak refractive power. Here, slightly negative refractive power is applied.

(Object Side Surface of G2: Surface S3)

The surface S3 which is an object side surface of the second lens is a concave aspheric surface. An aperture radius is 6.5345 mm. An effective diameter is 13.069 mm. Since data ambient light should also be received with a surface S2 outward, the aperture radius of the surface S3 is larger than that of the surface S2. A radius of curvature is R=−21.4570 mm. Since the surface S3 is negative and is a front surface of a lens, the surface S3 is a concave surface. The surface S3 has a function of spreading light beams incident on the middle portion of the second lens G2. This is applied to only the middle portion. Since a light beam that is obliquely incident on the peripheral portion from the outside should not leak from the second lens G2, the peripheral portion is formed to have a convex shape. Due to this convex surface, the light beams A, B, and C move in the horizontal direction after being incident obliquely upward and is then refracted. It is possible to spread the light beams by the convex surface. The eccentricity is K=−9.5654×10. Aspheric coefficients are as follows.

$A_2=+1.5839\times10^{-3}\,\text{mm}^{-1}$ $A_4=+5.4212\times10^{-1}\,\text{mm}^{-3}$ $A_6=-1.0868\times10^{-6}\,\text{mm}^{-5}$ $A_8=-8.1741\times10^{-10}\,\text{mm}^{-7}$ Since $A_4$ is positive, a part of the peripheral portion has a convex shape. Since $A_6$ and $A_8$ are negative, the curvature in a further peripheral portion changes, and accordingly, a part of the peripheral portion has a concave shape. Aspheric coefficients having higher orders than those described above are 0. A diffraction coefficient is 0. The thickness of the second lens is 3.700 mm.

(Image-Surface-Side Surface of G2: Surface S4)

The surface S4 which is an image-surface-side surface of the second lens G2 is a convex surface. A diffraction surface is formed. An aperture radius is 6.5345 mm. An effective diameter is 13.069 mm. A radius of curvature is R=−19.2228 mm. The surface S4 is quite a convex surface. Light beams passing through the peripheral portion are much refracted inward. Since an incidence angle is large, the light beams escape from the lens and cannot reach the image surface J unless the light beams are strongly bent. The thickness (3.7000 mm) of the second lens G2 is large in order that a light beam, which is incident on the vicinity of a middle portion and obliquely propagates, sufficiently spreads after passing through the surface S4. Since the first lens G1 and the second lens G2 is considerably distant from each other, composite refractive power is not strong. This requests the third lens G3 to have large refractive power. As described above, total refractive power 1/f is associated with the effective diameter D and the (maximum) viewing angle Y of a sensor by the relationship of 1/f=tan(Y/2)/D. Even in the case of the focal distance f, the focal distance f is defined for only paraxial rays, and accordingly, the focal distance f is not a focal distance in a strict sense of meaning. The above relationship is not a strict expression. In any case, the total refractive power 1/f is mostly decided if the effective dimension D and the viewing angle Y of a sensor are decided. If $1/f_{12}$ is small, compensation may be made with refractive power $1/f_3$ of the third lens G3. However, since an aberration is increased if the third lens G3 is made to be too convex, there is also limitation in increasing $1/f_3$. An upper limit of $f_{12}/f=1.6$ results from such a condition. In the first embodiment, $f_{12}/f$ is 1.2, which is an intermediate value. This means that a distance between the first and second lenses G1 and G2 is an intermediate value, and a value of $f_{12}$ is an intermediate value. The eccentricity is K=5.6553. Aspheric coefficients are as follows.

$$A_2 = +1.8617 \times 10^{-2} \, mm^{-1}$$

$$A_4 = -7.5704 \times 10^{-4} \, mm^{-3}$$

$$A_6 = +1.6904 \times 10^{-5} \, mm^{-5}$$

$$A_8 = -1.5461 \times 10^{-8} \, mm^{-7}$$

Diffraction coefficients are as follows.

$$C_1 = -4.5917 \times 10^{-3}$$

$$C_2 = -3.3224 \times 10^{-5} \, mm^{-1}$$

A distance between the second and third lenses G2 and G3 is 0.1000 mm, which is very small.

(Object Side Surface G3: Surface S5)

The surface S5 which is an object side surface of the third lens G3 is a convex surface. An aperture radius is 5.2652 mm. Since light beams are refracted inward by G2, the aperture radius of the surface S5 may be smaller than that of the surface S4. A radius of curvature is R=7.4743 mm.

Thus, it is important that a radius of curvature of the surface S5 is small and refractive power is large. Since the convex surface of the surface S4 and the convex surface of the surface S5 allow light beams to be strongly bent inward, a light beam having a large incidence angle is also drawn to an inner side such that an image can be formed on the image surface J. This is a condition of a lens system having a wide angle. This is needed particularly in a case where composite refractive power of the first and second lenses G1 and G2 is small (in a case where the composite focal distance $f_{12}$ is long). There is a limitation in making $f_{12}$ long.

If a lens system has a small diameter and a wide angle, the first and second lenses need to have quite high refractive power. This means that $f_{12}$ is short to some degree. The diameter of an image surface (sensor surface) is set to 'D'. An image that has an incidence angle of θ and is placed at the infinity is formed at the height of ftan θ on the image surface. A maximum incidence angle of a wide-angle lens is assumed to be Θ. Assuming that this forms a real image at an end of a sensor, a condition of 2 ftan Θ=D is obtained. This determines the upper limit of the entire focal distance f. However, this simplifies the condition. Since lenses of a constituent component have aspheric surfaces, the composite focal distance f is only defined for paraxial rays. The focal distance f cannot be defined for ambient light. Therefore, an explanation on the outline will be made using an approximate evaluation expression of 2 ftan Θ=D by extending a concept of the focal distance f which can be defined only for paraxial rays.

Since a maximum viewing angle Y of a lens is twice the maximum incidence angle, the maximum viewing angle Y is 2Θ (Y=2Θ). The entire focal distance f is f=D/2 tan Θ=D/2 tan(Y/2).

If the viewing angle Y is 50°, for example, f=1.07 D since Θ is 25°.

If the viewing angle Y is 60°, for example, f=0.87 D since Θ is 30°.

If the viewing angle Y is 70°, for example, f=0.71 D since Θ is 35°. In the invention, the viewing angle is in a range of 50° to 70°. Therefore, in this case, 0.71 D≦f≦1.07 D. For example, assuming that the aperture radius of a sensor is 5 mm, the diameter of the sensor is D=10 mm. In this case, 7.1 mm≦f≦10.7 mm. Since f and $f_{12}$ can be defined only for paraxial rays as described above, this is an approximate expression.

It depends on each lens constituting a lens system where the effective center of a lens is. Since a real image is not formed by the lenses G1 and G2 but is formed by only the lens G3, the effective center of a lens is in the neighborhood where the lens system G1, G2, and G3 exist.

In case where the composite refractive power of the first and second lenses is large ($f_{12}$ is short), light beams are collected sufficiently inward. Accordingly, a need to making a radius of curvature of the surface S5 short is decreased. On the contrary, in case where the composite refractive power of the first and second lenses is small ($f_{12}$ is long), light beams are not sufficiently collected. Accordingly, it is necessary to increase the radius of curvature of a convex surface of the surface S5.

In order to make a beam strongly refracted inward on the surface S5, a case where a distance between the surface S4 and the surface S5 is short is more effective than a case where the distance between the surface S4 and the surface S5 is long. The curvature of each of the surface S4 and the surface S5 needs to be further increased as the surface S4 and the surface S5 become more distant from each other. Then, since an aberration unnecessarily increases, it becomes difficult to correct the aberration. In order to avoid such a problem, the distance between the surface S4 and the surface S5 is set short. Although the distance between the surface S4 and the surface S5 is set to 0.1 mm, the surface S4 and the surface S5 are almost in contact with each other. The distance between the surface S4 and the surface S5 may be 1 mm or less. The eccentricity is K=−4.0605. Aspheric coefficients are as follows.

$$A_2 = +1.1321 \times 10^{-2} \, mm^{-1}$$

$$A_4 = +4.4483 \times 10^{-5} \, mm^{-3}$$

$$A_6 = -1.6099 \times 10^{-7} \, mm^{-5}$$

$$A_8 = -9.2330 \times 10^{-7} \, mm^{-7}$$

Since $A_6$ and $A_8$ are negative, the peripheral portion has a concave shape. This serves to spread ambient light. Each diffraction coefficient is 0. The thickness of the third lens G3 is 3.4000 mm.

(Image-Surface-Side Surface of G3: Surface S6)

The surface S6 which is an image-surface-side surface of the third lens G3 is a concave aspheric surface. An aperture radius is 4.9976 mm. A radius of curvature is R=8.8298 mm. The eccentricity is K=+6.5860×10⁻¹. Aspheric coefficients are as follows.

$$A_2 = -1.4526 \times 10^{-2} \, mm^{-1}$$

$$A_4 = +1.9179 \times 10^{-3} \, mm^{-3}$$

$A_6 = -1.3924 \times 10^{-4} \, \text{mm}^{-5}$ $A_8 = +1.7558 \times 10^{-6} \, \text{mm}^{-7}$ Each diffraction coefficient is 0. The surface S6 is a concave surface in the middle portion. The surface S6 serves to spread light beams that have strongly converged to the middle by the surface S5. The focal distance f3 of the third lens G3 is positive as a whole, and the third lens G3 has positive refractive power ($1/f_3$). However, it is refractive power corresponding to an intermediate degree. In case where $f_{12}$ is long (refractive power of G1 and G2 is weak), the third lens G3 should share considerable positive refractive power. However, when $f_{12}$ is short, high refractive power ($1/f_3$) is not requested to the third lens G3.

The third lens G3 serves to cause an image to be successfully formed on an end of a sensor by spreading ambient light having a wide incidence angle θ without making most light beams on an axis having a small incidence angle θ not converging. This is a reason why the surface S5 is a concave surface and the surface S6 is a convex surface in the outer periphery portion of the third lens G3. The third lens G3 has negative refractive power near the outer periphery. Since the refractive power of the third lens G3 is neither strong nor weak, the total focal distance is slightly decreased due to the third lens G3 that is added. Since $f_{12}$ is 10.46 mm and f is 8.48 mm, the focal distance is shortened by about 2 mm due to the third lens G3. This is because the third lens G3 has positive refractive power in the middle portion thereof.

A distance between the back surface S6 of the lens G3 and the front surface S7 of the sensor window W is 2.6264 mm. A value obtained by adding the distance described above, the window thickness, and a window-to-sensor distance is about 5.3 mm. This is called a back focus and is a narrow back focus. Since the window-to-sensor distance is short (1.64 mm), it is possible to provide a shutter between the window and the third lens G3 even in the case of the narrow back focus.

(Object Side Surface of a Window: Surface S7)

The sensor window W is formed integrally with the sensor and is formed of not ZnS but Ge. The object side surface S7 is flat. The radius of curvature is infinite and an aspheric coefficient is 0. The thickness of the sensor window W is 1.000 mm. An aperture radius is 4.9487 mm. An effective diameter is 9.894 mm.

(Image-Surface-Side Surface of a Window: Surface S8)

The image-surface-side surface S8 of a window is also flat. The radius of curvature is infinite and an aspheric coefficient is 0. A distance between the back surface S8 of the window and the sensor surface S9 is 1.6400 mm. An aperture radius is 4.9411 mm. An effective diameter is 9.8822 mm.

(Sensor Surface: Surface S9)

The surface S9 is a sensor surface where pixels are arranged in all directions. An aperture radius is 5.0000 mm. An effective diameter is 10 mm. In the case of a pixel having a size of 50 μm square, a pixel group of 200×200 can be provided in all directions. In the case of a pixel having a size of 25 μm square, a pixel group of 400×400 can be provided in all directions.

An MTF curve of the lens according to the first embodiment is shown in FIG. 2. A horizontal axis indicates a spatial frequency (unit: lp/mm). A vertical axis indicates modulation. An incidence angle is set to 0° (on an axis), 19.84°, 26.07°, and 32.10°. Sagittal and tangential of incident light which is incident at each angle are shown. The tangential is a value of a slope of an incidence angle in a direction of a tangential line, and the sagittal is a value in a direction perpendicular to the direction described above.

a: diffraction limit
b: light on axis (0°)
c: 19.84° tangential
d: 19.84° sagittal
e: 26.07° tangential
f: 26.07° sagittal
g: 32.10° tangential
h: 32.10° sagittal From experiences, in order for this lens system to form a high-resolution image on the sensor located on an image surface, an MTF at the Nyquist frequency which is the reciprocal (½p) of twice (2p) a pixel pitch p of a sensor should be 0.2 or more. In the case when the pixel pitch is 25 μm, the Nyquist frequency is 20 lp/mm.

According to this graph, an MTF of sagittal in the 'f' case of an incidence angle of 26.07° decreases to 0.42 at a spatial frequency of 20 lp/mm, to 0.33 at a spatial frequency of 24 lp/mm, and to 0.26 at a spatial frequency of 28 lp/mm.

An MTF in the 'b' case of an incidence angle of 0° (on an axis) decreases to 0.49 at a spatial frequency of 20 lp/mm, to 0.38 at a spatial frequency of 24 lp/mm, and to 0.30 at a spatial frequency of 28 lp/mm.

However, in any cases, the condition that an MTF is 0.2 or more at a spatial frequency of 20 lp/mm is satisfied. The MTF graph is easily understood as a whole, but it is difficult to see a value at a specific spatial frequency.

TABLE 2

| | MTF | |
| --- | --- | --- |
| | Sagittal | Tangential |
| 0.00° | 0.494 | 0.494 |
| 19.84° | 0.526 | 0.533 |
| 26.07° | 0.422 | 0.553 |
| 32.10° | 0.534 | 0.522 |

Table 2 indicates values of sagittal and tangential of MTF at a spatial frequency of 20 lp/mm when incidence angles of the lens in the first embodiment are 0°, 19.84°, 26.07°, and 32.10°. 20 lp/mm is the Nyquist frequency when a pixel pitch is set to 25 μm. In an angle range shown in the graph and the table, MTFs of both sagittal and tangential is larger than 0.2 when the Nyquist frequency is 20 lp/mm.

High resolution requested when combining an imaging device (8 mm×6 mm) having a pixel pitch of 25 μm and a pixel size of 320×240 can be realized. In this case, since the pixel pitch is p=0.025 mm, the Nyquist frequency is ½p=20 lp/mm. In the case when an incidence angle is 26.07°, an MTF of sagittal is 0.422 and an MTF of tangential is 0.553 at the Nyquist frequency of 20 lp/mm. Even in the case when an incidence angle is 32.10°, an MTF of sagittal is 0.534 and an MTF of tangential is 0.522. Since the incidence angle is an angle between a normal and a beam, a viewing angle becomes twice the maximum incidence angle. Since every MTF at the Nyquist frequency of 20 lp/mm is 0.2 or more in a condition where an incidence angle is in a range of 0° to 32.10°, it is possible to realize a high-resolution camera in combination with an imaging device having a pixel pitch of 25 μm.

In addition, since the lens thickness in the entire lens system can be suppressed small by using an aspheric surface, a bright lens system can be realized. Maximum diameter, curvature, center thickness (1.5 mm to 8 mm), edge thickness (periphery thickness; 1 to 8 mm), and sag amount (less than 5 mm) of each lens satisfy the above-mentioned conditions. As a result, manufacture based on molding becomes possible.

Values of the sag amount and the edge thickness in the first embodiment are enumerated below.

Sag Amount

G1 lens: (object side) 0.4876 mm, (image surface side) 0.2289 mm

G2 lens: (object side) 0.5816 mm, (image surface side) 0.8210 mm

G3 lens: (object side) 1.2329 mm, (image surface side) 1.0266 mm

Edge Thickness

G1 lens: 2.5413 mm

G2 lens: 2.2974 mm

G3 lens: 3.1937 mm

Second Embodiment

Figure 3:
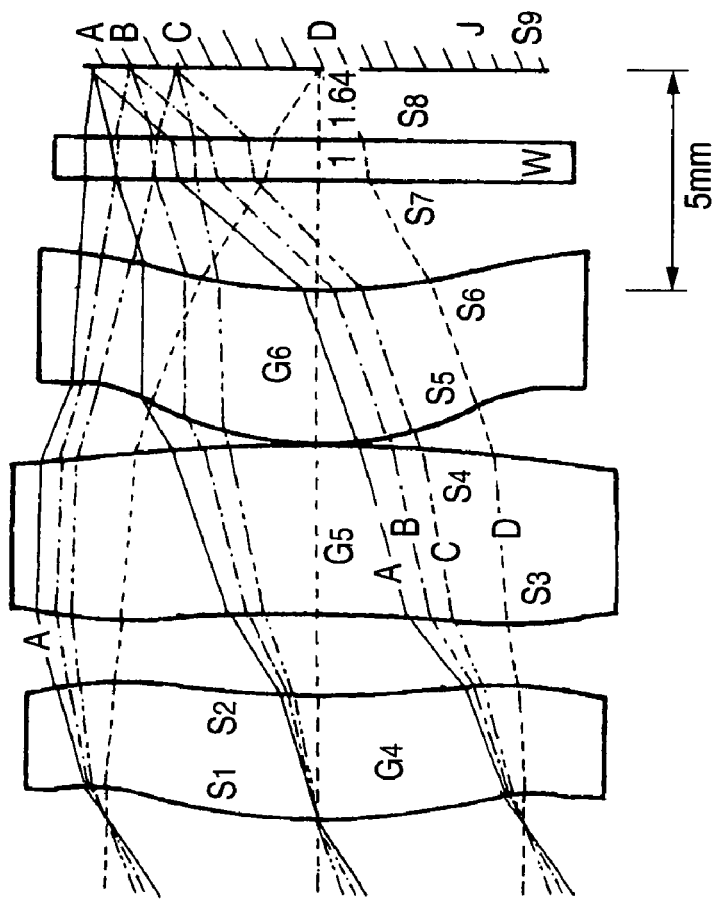
FIG. 3 is a cross-sectional view illustrating a far-infrared camera lens according to a second embodiment of the invention that is configured to include three lenses of: a first lens G4 having a middle portion, which is convex on an object side and concave on an image surface side, and a peripheral portion, which is concave on the object side and convex on the image surface side; a second lens G5 having a middle portion, which is concave on an object side and concave on an image surface side, and a peripheral portion, which is convex on the object side and has a positive refractive power; and a third lens G6 having a middle portion, which is convex on an object side and concave on an image surface side, and a peripheral portion, which is concave on the object side and convex on the image surface side.
Figure 4:
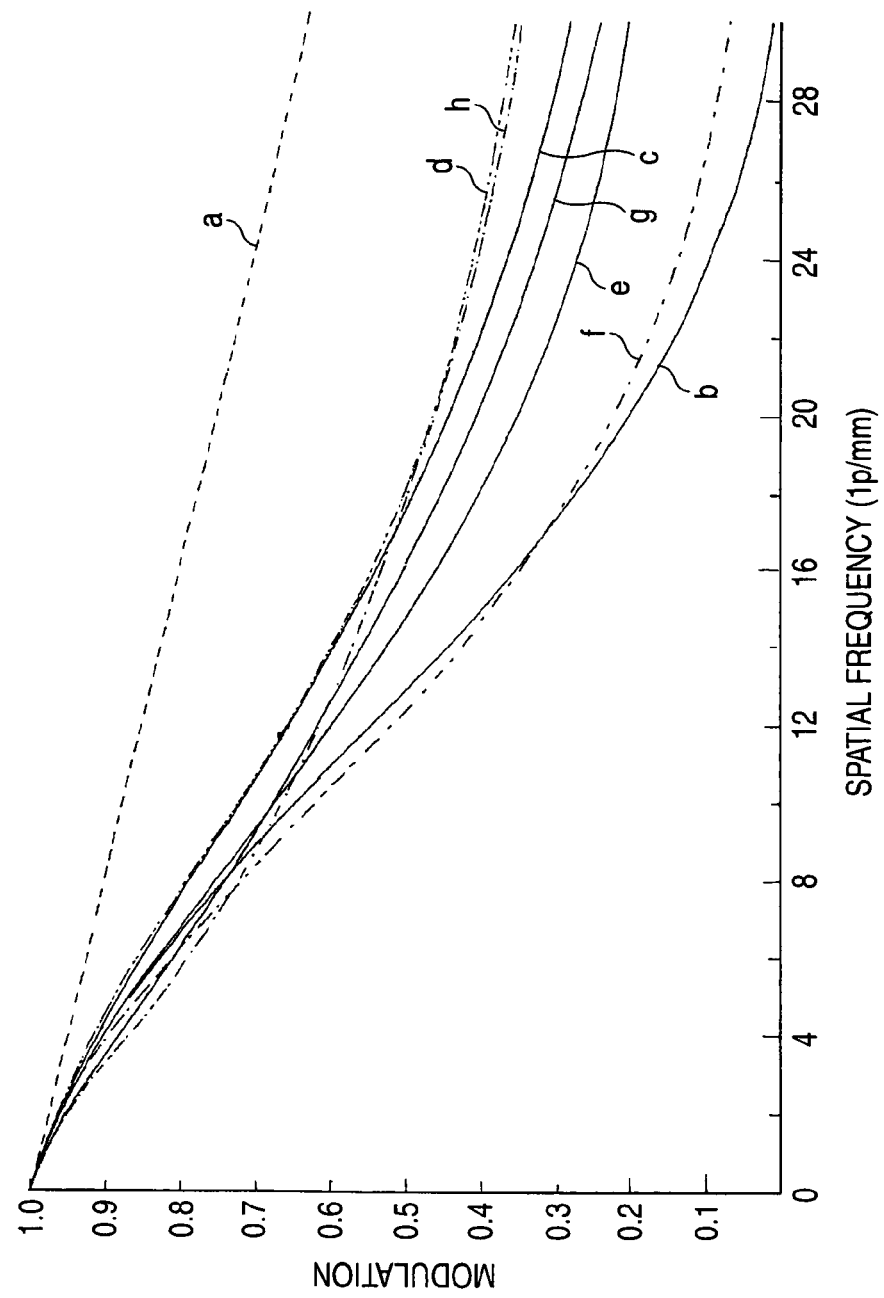
FIG. 4 is a graph illustrating an MTF curve when a spatial frequency of the far-infrared camera lens according to the second embodiment is on a horizontal axis, modulation is on a vertical axis, and an incidence angle is a parameter.

FIGS. 3 and 4

ZnS, a set of three lenses (G4, G5, G6)

$f_{12}/f=1.59$ $f=8.49$ mm $f_{12}=13.5$ mm

F value 0.94

Maximum diameter 9 mm

Distortion −4.38%

Viewing angle 64.22°

In the second embodiment, a viewing angle is 64.22°, which is a sufficiently wide angle. In order to obtain a wide angle, f is 8.49 mm which is short. When D is calculated from the previous expression D=2 f tan (Y/2), D=10.65 mm, but the sensor diameter is 10 mm which is slightly insufficient. However, from a point of view of an MTF, the MTF is 0.2 or more even in a case of a light beam having an incidence angle of 32.11°. Accordingly, the viewing angle 64.22° is sufficient.

FIG. 3 illustrates a cross section of a lens system according to the second embodiment. This lens system is also configured to include three lenses G4, G5, and G6 and is formed of ZnS. A flat member corresponding to a fourth sheet is a window W of a sensor. The sensor window is provided in a sensor and is formed of Ge. A shutter (not shown) is provided between the last lens G6 and the window W. A sensor surface (image surface; image formed surface) J is positioned behind the window W.

An object side surface S1 of the first lens G4 that is an objective lens is an aspheric convex surface. The peripheral portion of the surface S1 has a concave surface in order that light beams incident on the periphery are not strongly bent inward. An image-surface-side surface S2 is also an aspheric surface, and a middle portion thereof is a concave surface but a periphery portion thereof has a convex circumference surface. Since the ambient light having a high incidence angle passes through a concave surface of the surface S1 and is not sufficiently bent, the surface S2 has the convex circumference surface. The second (middle) lens G5 is a thick lens. Since obliquely incident light should be condensed even if the obliquely incident light is incident on the peripheral portion, the effective diameter of the second lens G5 is wider than that of the first lens G4. In the case of an object side surface S3 of the second lens G5, a middle portion thereof is concave and the perimeter is convex in a circle shape. In addition, since the surface S3 is an aspheric surface, a diffraction surface is formed. Since a peripheral part of incident light beams is not sufficiently bent by the first lens G4, the peripheral part of incident light beams is refracted inward due to the convex circular ring of the second lens G5. An image-surface-side surface S4 of the second lens G5 is a convex surface. The surface S2 and the surface S4 each have a diffraction surface.

The second lens G5 and the third lens G6 are very close to each other, and there is almost no gap therebetween. An object side surface S5 of the third lens G6 is an aspheric surface. A middle portion of the surface S5 is very convex and the perimeter of the surface S5 is concave. An image-surface-side surface S6 of the third lens G6 is a very concave surface. The surface S6 does not have a uniform curvature but the curvature is reduced in the peripheral portion thereof.

As can be seen from FIG. 3, the refractive power ($1/f_{12}$) of the first and second lenses G4 and G5 is weak, and $f_{12}=13.5$ mm. This is a long composite focal distance. The third lens G6 has strong positive refractive power. This supplements the weak refractive power of $f_{12}$. Although $f_{12}=13.5$ mm is too long, the weak refractive power is supplemented by the strong refractive power of the third lens G6, and as a whole, f=8.49 mm. Since $f_{12}/f=1.59$, the value falls within a range of 0.9 to 1.6 requested in the invention. A limit value 1.6 is an upper limit (lower limit of refractive power of G4 and G5) of $f_{12}$. Since the F value is 0.94, it is a sufficiently bright lens.

An MTF curve of the lens according to the second embodiment is shown in FIG. 4. A horizontal axis indicates a spatial frequency (unit: lp/mm). A vertical axis indicates modulation. An incidence angle is set to 0° (on an axis), 19.81°, 26.04°, and 32.11°. Sagittal and tangential of incident light which is incident at each angle are shown.

a: diffraction limit b: light on axis (0°)

c: 19.81° tangential d: 19.81° sagittal e: 26.04° tangential f: 26.04° sagittal g: 32.11° tangential h: 32.11° sagittal According to this graph, a decrease in MTF of a light beam (having an incidence angle of 0°) of (b) with a spatial frequency is remarkable. An MTF of the light beam having an incidence angle of 0° decreases to 0.20 when the spatial frequency is 20 lp/mm and to 0.10 when the spatial frequency is 24 lp/mm. A decrease in MTF is noticeable even in sagittal in the 'f' case of an incidence angle of 26.04°. In the case of sagittal corresponding to 26.04°, an MTF is 0.22 at 20 lp/mm and 0.14 at 24 lp/mm.

However, in any cases, the condition that an MTF is 0.2 or more at a spatial frequency of 20 lp/mm is satisfied. For combination with a sensor configured to include a plurality of pixels, an MTF should be 0.2 or more at the Nyquist frequency corresponding to the pixel size. This satisfies a condition that the MFT is 0.2 or more at a spatial frequency of 20 lp/mm for all incidence angles within 32.11°. Therefore, a viewing angle is 64.22° or more.

TABLE 3

| | MTF | |
| --- | --- | --- |
| | Sagittal | Tangential |
| 0.00° | 0.205 | 0.205 |
| 19.81° | 0.469 | 0.466 |
| 26.04° | 0.224 | 0.355 |
| 32.11° | 0.467 | 0.409 |

Table 3 indicates values of sagittal and tangential of MTF at a spatial frequency of 20 lp/mm when incidence angles of the lens in the second embodiment are 0°, 19.81°, 26.04°, and 32.11°. As described above, 20 lp/mm is the Nyquist frequency when a pixel pitch is set to 25 μm. If the pixel pitch is made smaller, an MTF at a higher spatial frequency causes a problem. As described above, a decrease in MTF of a light beam on an axis (light beam having an incidence angle of 0°) is noticeable. In the case when an incidence angle is 0°, an MTF of sagittal is 0.205 and an MTF of tangential is 0.205. An MTF of sagittal when an incidence angle is 26.04° is 0.224. The other values are larger than those values. That is, in an angle range shown in the graph and the table, an MTF is larger than 0.2 at 20 lp/mm. Since a viewing angle is twice an effective incidence angle, the viewing angle is 64.22° in this lens system. At Θ=32.11°, there is still a margin. Accordingly, an actual viewing angle is larger than that described above.

Values of sag amount, central thickness, and edge thickness in the second embodiment are enumerated below.

Sag Amount
G4 lens: (object side) 0.6600 mm, (image surface side) 0.1119 mm
G5 lens: (object side) 0.0055 mm, (image surface side) 0.3700 mm
G6 lens: (object side) 1.3000 mm, (image surface side) 0.7682 mm
Central Thickness
G4 lens: 2.8 mm
G5 lens: 3.7 mm
G6 lens: 3.4 mm
Edge Thickness
G4 lens: 2.2519 mm
G5 lens: 3.3245 mm
G6 lens: 2.8682 mm Third Embodiment FIGS. 5 and 6

ZnS, a set of three lenses (G7, G8, G9)
$f_{12}/f=0.91$
$f=7.68$ mm
$f_{12}=7$ mm
F value 1.06
Maximum diameter 7.2 mm
Distortion −5.8%
Viewing angle 68.90°

In the third embodiment, a viewing angle is 68.90°, which is a sufficiently wide angle. In order to obtain a wide angle, $f_{12}$ is 7 mm which is short. f is 7.68 mm which is also short. Since $f_{12}/f=0.91$, the value falls within a range of 0.9 to 1.6 requested in the invention. Since the F value is 1.06, it is a sufficiently bright lens. Referring to the above-described expression of D=2 ftan(Y/2), 2 ftan 34.45°=10.5 mm. Since the effective dimension D of a sensor is 10 mm but f, which is effective for ambient light, is shorter than 7.68 mm, light corresponding to Θ=34.45° can be successfully formed on an end of an image surface.

Figure 5:
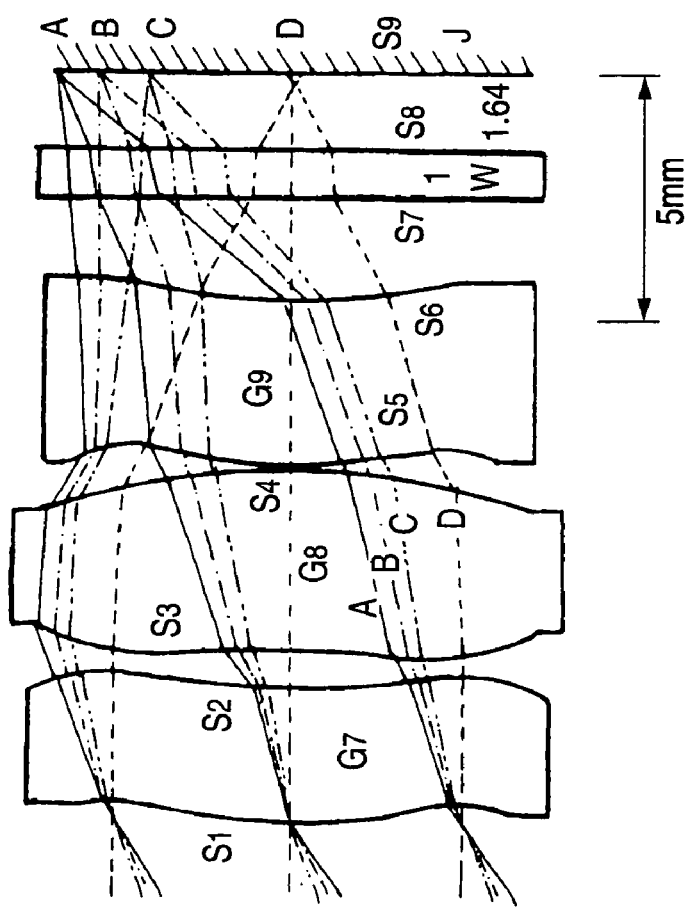
FIG. 5 is a cross-sectional view illustrating a far-infrared camera lens according to a third embodiment of the invention that is configured to include three lenses of: a first lens G7 having a middle portion, which is convex on an object side and concave on an image surface side, and a peripheral portion, which is concave on the object side and convex on the image surface side; a second lens G8 having a middle portion, which is concave on an object side and concave on an image surface side, and a peripheral portion, which is convex on the object side and has a positive refractive power; and a third lens G9 having a middle portion, which is convex on an object side and concave on an image surface side, and a peripheral portion, which is concave on the object side and convex on the image surface side.

FIG. 5 illustrates a cross section of a lens system according to the third embodiment. This lens system is also configured to include three lenses G7, G8, and G9 and is formed of ZnS. A flat member corresponding to a fourth sheet is a window W of a sensor. The sensor window W is provided in a sensor and is formed of Ge. A shutter (not shown) may be provided between the last lens G9 and the window W. A sensor surface (image surface; image formed surface) J is positioned behind the window W.

The first lens G7, which is an objective lens, is a lens having a convex surface with positive refractive power on an object side. A middle portion of a first surface S1 has a convex surface. A middle portion of a second surface S2 has a concave surface. A peripheral portion of the surface S1 is a concave peripheral surface, and a peripheral portion of the surface S2 is a convex peripheral surface. This is to reduce bending of ambient light having a large incidence angle because a large aberration occurs if beams incident on the peripheral portions at a wide angle are bent too much.

An object side surface S3 of the second (middle) lens G8 has a concave shape in the middle and a convex shape in the periphery. An image-surface-side surface S4 of the second lens G8 is a convex surface, which forms a very convex curve. This is to cause light incident on the periphery to be strongly bent inward. In order to realize a wide viewing angle, the second lens makes ambient light refracted much. In addition, the second lens G8 has an effective diameter larger than the first lens G7. An object side surface S5 of the third lens G9 is a convex surface. An image-surface-side surface S6 is a concave surface. A convex meniscus lens is formed on the object side. Convex surfaces of the surfaces S4 and S5 are especially important. Due to the convex surface of the surface S4 and the convex surface of the surface S5, light beams that are incident at high incidence angles are much refracted toward the middle. This is the same as in the first and second embodiments.

Points that are different from the first and second embodiments are that a distance between the first lens G7 and the second lens G8 is short and the refractive power of the meniscus lens G9 is weak. This means the following.

Since the lenses G7 and G8 both of which are convex lenses are adjacent (about 0.7 mm), composite refractive power is increased. Accordingly, the composite focal distance $f_{12}$ becomes short. A composite focal distance of f1 and f2 is obtained on the basis of $1/f_{12}=1/f_1+1/f_2-u/f_1 f_2$. 'u' is a distance between lenses. In the third embodiment, 'u' is short. Accordingly, the refractive power is large and the focal distance $f_{12}$ is short. In the third embodiment, most of the total refractive power that is required can be achieved by the first and second lenses G7 and G8. When the composite refractive power of $1/f=1/7.68$ mm=0.130 mm$^{-1}$ is compared with the refractive power of $1/f_{12}=1/7$ mm=0.143 mm$^{-1}$ using the lenses G7 and G8, $1/f_{12}$ is larger. The first and second lenses G7 and G8 are adjacent to each other and the distance therebetween is about 0.1 mm. Therefore, the refractive power 1/f3 of the third lens G9 is negative. The third lens G9 serves as a negative meniscus lens. In this case, $f_{12}/f=0.91$. This is an example in which the third lens G9 may be a negative meniscus lens if the refractive power of the first and second lenses G7 and G8 is high. This is an embodiment near the lower limit of $0.9 \leq f_{12}/f \leq 1.6$.

Figure 6:
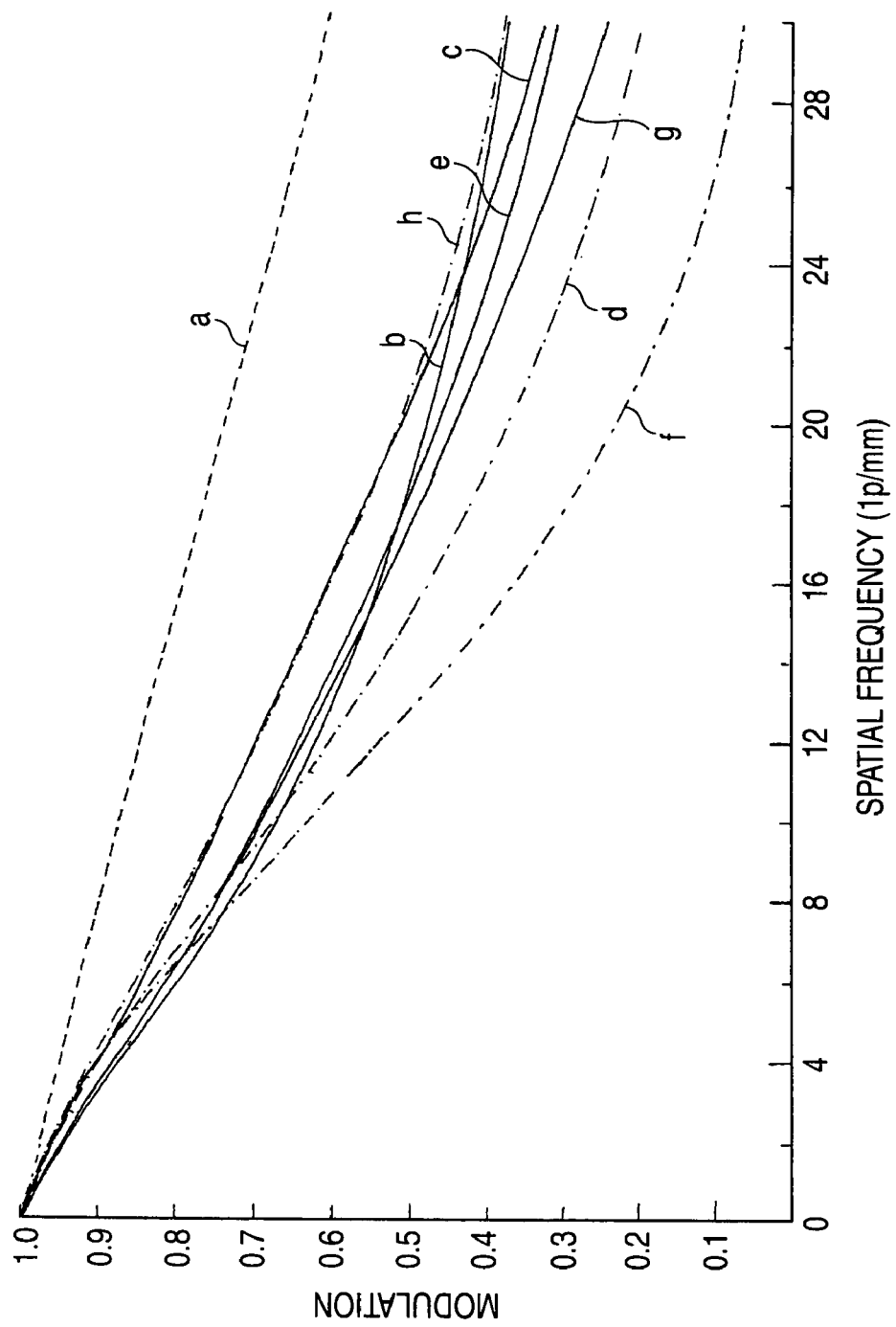
FIG. 6 is a graph illustrating an MTF curve when a spatial frequency of the far-infrared camera lens according to the third embodiment is on a horizontal axis, modulation is on a vertical axis, and an incidence angle is a parameter.

An MTF curve of the lens according to the third embodiment is shown in FIG. 6. A horizontal axis indicates a spatial frequency (unit: lp/mm). A vertical axis indicates modulation. An incidence angle is set to 0° (on an axis), 21.47°, 28.06°, and 34.45° Sagittal and tangential of incident light which is incident at each angle are shown.
  a: diffraction limit
  b: light on axis (0°)
  c: 21.47° tangential
  d: 21.47° sagittal,
  e: 28.06° tangential
  f: 28.06° sagittal
  g: 34.45° tangential
  h: 34.45° sagittal In order to obtain high resolution, an MTF should be 0.2 or more at the Nyquist frequency corresponding to the pixel size in all angles of view. The Nyquist frequency changes with the pixel size of a sensor. As described above, in the case of a sensor having a pixel with 25 μm square, the Nyquist frequency is 20 lp/mm. In the above angle range, the MTF is 0.2 or more at a spatial frequency of 20 lp/mm.

According to this graph, sagittal in the 'f' case of an incidence angle of 28.06° decreases to 0.07 at a spatial frequency of 28 lp/mm, to 0.13 at a spatial frequency of 24 lp/mm, and to 0.23 at a spatial frequency of 20 lp/mm. Tangential in the 'b' case of an incidence angle of 21.47° decreases to 0.29 at 24 lp/mm and to 0.37 at a spatial frequency of 20 lp/mm. However, in any cases, the condition that an MTF is 0.2 or more at a spatial frequency of 20 lp/mm is satisfied.

TABLE 4

|  | Sagittal | Tangential |
| --- | --- | --- |
| 0.00° | 0.477 | 0.477 |
| 21.47° | 0.37 | 0.509 |
| 28.06° | 0.227 | 0.462 |
| 34.45° | 0.515 | 0.438 |

Table 4 indicates values of sagittal and tangential of MTF at a spatial frequency of 20 lp/mm when incidence angles of the lens in the third embodiment are 0°, 21.47°, 28.06°, and 34.45°. As described above, 20 lp/mm is the Nyquist frequency when a pixel pitch is set to 25 μm. If the pixel pitch is made smaller, an MTF at a higher spatial frequency is a problem.

An MTF of sagittal at 28.06° is 0.227, which is a minimum value in Table 4. In the case of a beam having an incidence angle of 34.45° C., an MTF of tangential is 0.438 and an MTF of sagittal is 0.515. That is, in any cases within the angle range shown in the table, the MTF is larger than 0.2 at the time of 20 lp/mm. Since an effective viewing angle is twice an effective incidence angle, the effective viewing angle is 68.9° in this lens system. At an incidence angle of 34.45°, there is still a margin up to 0.2. Accordingly, an actual viewing angle is larger than that described above.

Values of sag amount, central thickness, and edge thickness in the third embodiment are enumerated below.

Figure 7:
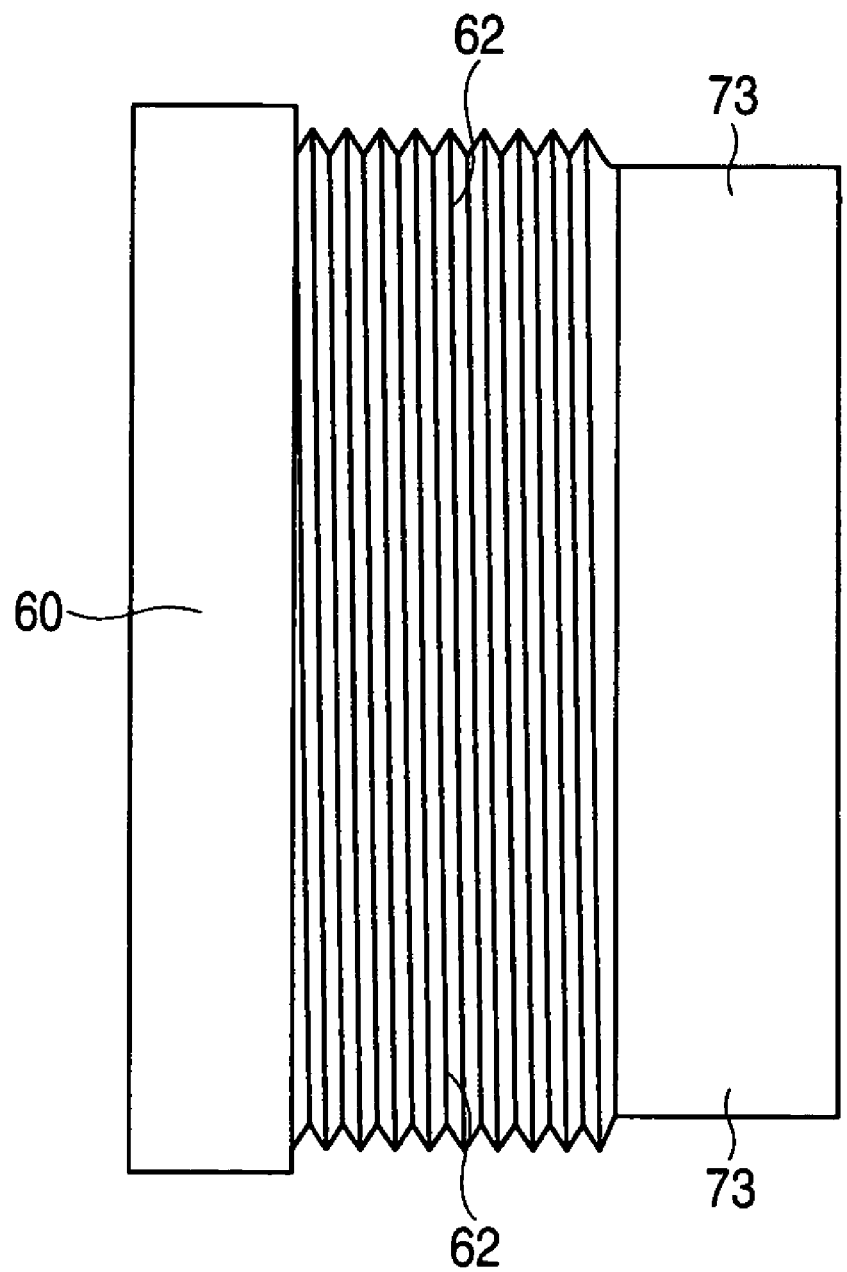
FIG. 7 is a side surface view illustrating a lens unit according to a fourth embodiment of the invention in which the far-infrared lens according to the first embodiment and a spacer are provided in a lens barrel and a lens presser is fixed to the lens barrel.
Figure 8:
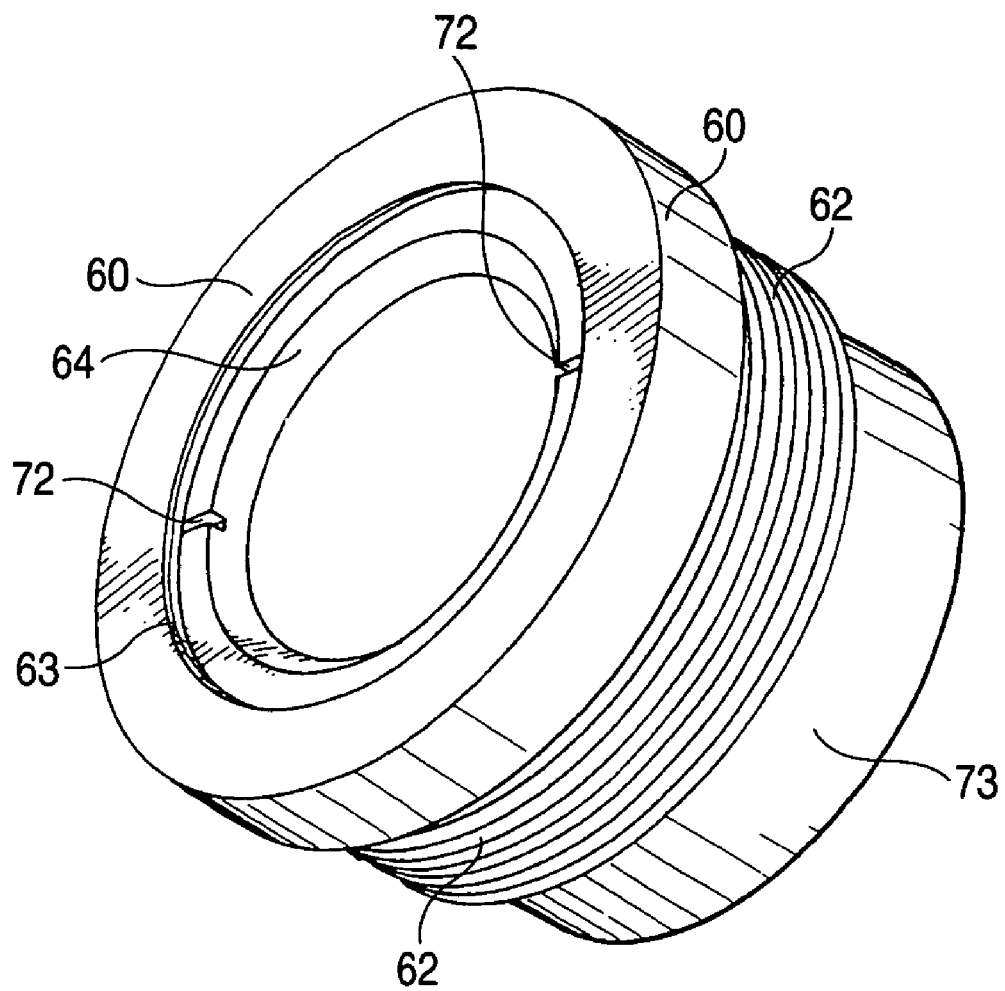
FIG. 8 is a perspective view illustrating the lens unit according to the fourth embodiment of the invention in which the far-infrared lens according to the first embodiment and the spacer are provided in the lens barrel and the lens presser is fixed to the lens barrel.
Figure 9:
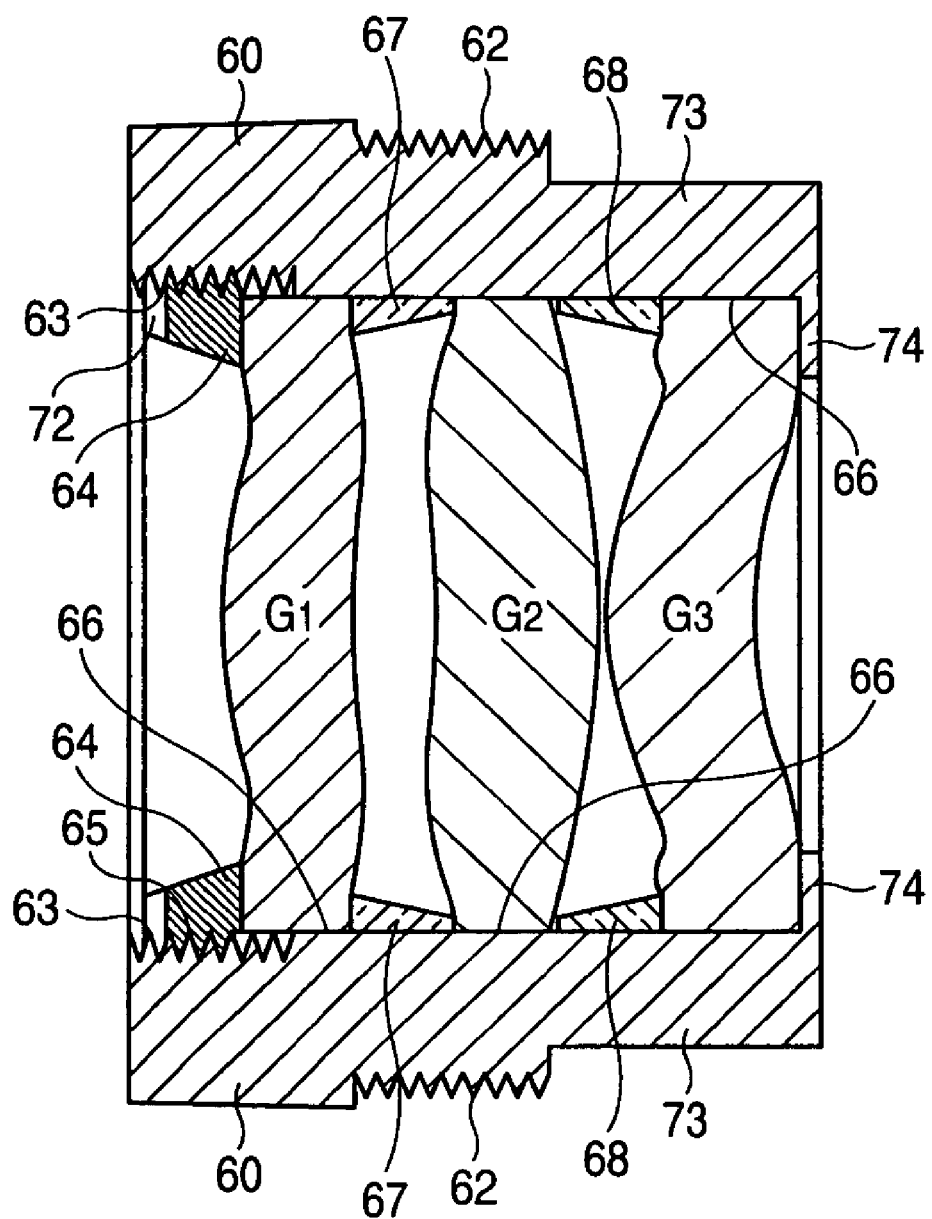
FIG. 9 is a longitudinal sectional view illustrating the lens unit according to the fourth embodiment of the invention in which the far-infrared lens according to the first embodiment and the spacer are provided in the lens barrel and the lens presser is fixed to the lens barrel.

Sag Amount
G7 lens: (object side) 0.4411 mm, (image surface side) 0.1307 mm
G8 lens: (object side) 0.4388 mm, (image surface side) 0.7163 mm
G9 lens: (object side) 0.2742 mm, (image surface side) 0.4604 mm
Central Thickness:
G7 lens: 2.8 mm
G8 lens: 3.7 mm
G9 lens: 3.4 mm
Edge Thickness:
G7 lens: 2.4896 mm
G8 lens: 2.5449 mm
G9 lens: 3.5862 mm Fourth Embodiment A Lens Unit Configured to Include Three Lenses
(FIGS. 7, 8, and 9)

A lens unit is formed by using a set of far-infrared lenses according to the first embodiment. An entire side surface view of the lens unit is shown in FIG. 7. A perspective view of the lens unit is shown in FIG. 8. A longitudinal sectional view of the lens unit is shown in FIG. 9.

A lens barrel 60, which is formed of metal and has a cylindrical shape, has a male thread strip 62 at the middle position of an outer peripheral surface and a female thread portion 63 positioned at the front of an inner peripheral surface. An inner peripheral surface of the lens barrel 60 is a smooth inner tubular surface 66 positioned at middle and rear portions thereof. A locking protrusion 74 that protrudes inward is provided at a last side of the inner peripheral surface. The front side of the male thread strip 62 positioned in the middle of the outer periphery is a smooth surface portion having a large diameter. A smooth portion 73 having a smaller diameter than the male thread strip 62 is provided behind the male thread strip 62.

A lens presser 64, which is formed of metal and has a ring shape, has a male thread portion 65 in the outer periphery thereof. The male thread portion 65 can be screwed to the female thread portion 63 of the lens barrel 60. Notches 72 located in a line in the diameter direction are provided ahead of the lens presser 64. The lens presser 64 is attached to or detached from the lens barrel 60 by inserting a fixture in the notches 72 and turning the lens presser 64 around a central axis. The lens barrel 60 and the lens presser 64 can be formed of aluminum, for example.

The third lens G3, a second spacer 68, the second lens G2, a first spacer 67, and the first lens G1 are inserted along the inner tubular surface 66 of the lens barrel 60 sequentially from the back. A rear surface of the third lens G3 is pressed by the locking protrusion 74 located at the last end. The position of the third lens G3 in the axial direction thereof is determined. The second spacer 68 has an approximately cylindrical shape and is inserted between the third lens G3 and the second lens G2 such that the relative position between the second and third lenses G2 and G3 is determined. The first spacer 67 is positioned between the second lens G2 and the first lens G1 such that the relative position between the first and second lenses G1 and G2 is determined. The male thread portion 65 of the lens presser 64 is screwed to the front female thread portion 63 of the lens barrel 60 to thereby press a front portion of the first lens G1. The lens presser 64 can be screwed and fixed to the lens barrel 60 by inserting a fixture in the notch 72 and turning the fixture to the right. The lens presser 64 can be removed from the lens barrel 60 by turning the fixture to the left.

By operations of the spacers 67 and 68, a distance between the first and second lenses G1 and G2 is set to 1.8382 mm and a distance between the second and third lenses G2 and G3 is set to 0.1000 mm. The spacers 67 and 68 are formed in a ring shape by using aluminum, ceramics, plastics, and the like.

Fifth Embodiment

Figure 10:
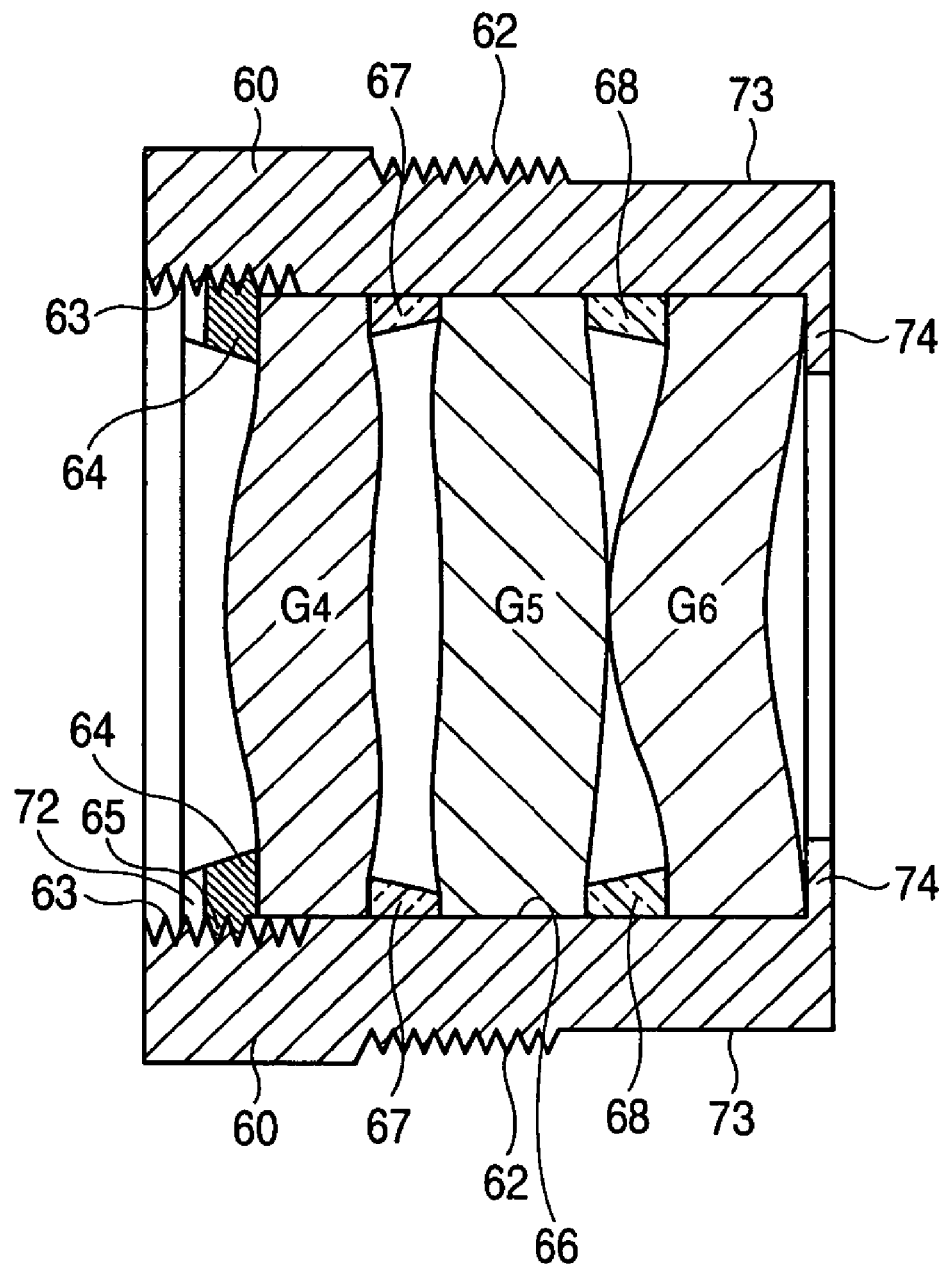
FIG. 10 is a longitudinal sectional view illustrating a lens unit according to a fifth embodiment of the invention in which the far-infrared lens according to the second embodiment and a spacer are provided in a lens barrel and a lens presser is fixed to the lens barrel.

A Lens Unit Configured to Include Three Lenses
(FIG. 10)

A lens unit is formed by using a set of far-infrared lenses according to the second embodiment. A side surface view and a perspective view of the lens unit are almost the same as those shown in FIGS. 7 and 8. A longitudinal sectional view of the lens unit is shown in FIG. 10. A lens barrel 60, which is formed of metal and has a cylindrical shape, has a male thread strip 62 at the middle position of an outer peripheral surface and a female thread portion 63 positioned at the front of an inner peripheral surface. The inner peripheral surface of the lens barrel 60 has a smooth inner tubular surface 66 positioned at middle and rear portions thereof. A locking protrusion 74 that protrudes inward is provided at a last side of the inner peripheral surface. The front side of the male thread strip 62 positioned in the middle of the outer periphery is a smooth surface portion having a large diameter. A smooth portion 73 having a smaller diameter than the male thread strip 62 is provided behind the male thread strip 62.

A lens presser 64, which is formed of metal and has a ring shape, has a male thread portion 65 in the outer periphery thereof. The male thread portion 65 can be screwed to the female thread portion 63 of the lens barrel 60. Notches 72 located in a line in the diameter direction are provided ahead of the lens presser 64. The lens presser 64 is attached to or detached from the lens barrel 60 by inserting a fixture in the notches 72 and turning the lens presser 64 around a central axis. The lens barrel 60 and the lens presser 64 can be formed of aluminum, for example.

The third lens G6, a second spacer 68, the second lens G5, a first spacer 67, and the first lens G4 are inserted along the inner tubular surface 66 of the lens barrel 60 sequentially from the back. A rear surface of the third lens G6 is pressed by the locking protrusion 74 located at the last end. The position of the third lens G6 in the axial direction thereof is determined. The second spacer 68 has an approximately cylindrical shape and is inserted between the third lens G6 and the second lens G5 such that the relative position between the second and third lenses G5 and G6 is determined. The first spacer 67 is positioned between the second lens G5 and the first lens G4 such that the relative position between the first and second lenses G4 and G5 is determined. The male thread portion 65 of the lens presser 64 is screwed to the front female thread portion 63 of the lens barrel 60 to thereby press a front portion of the first lens G4. The lens presser 64 can be screwed and fixed to the lens barrel 60 by inserting a fixture in the notch 72 and turning the fixture to the right. The lens presser 64 can be removed from the lens barrel 60 by turning the fixture to the left.

The spacers 67 and 68 are formed in a ring shape by using aluminum, ceramics, plastics, and the like.

Sixth Embodiment

Figure 11:
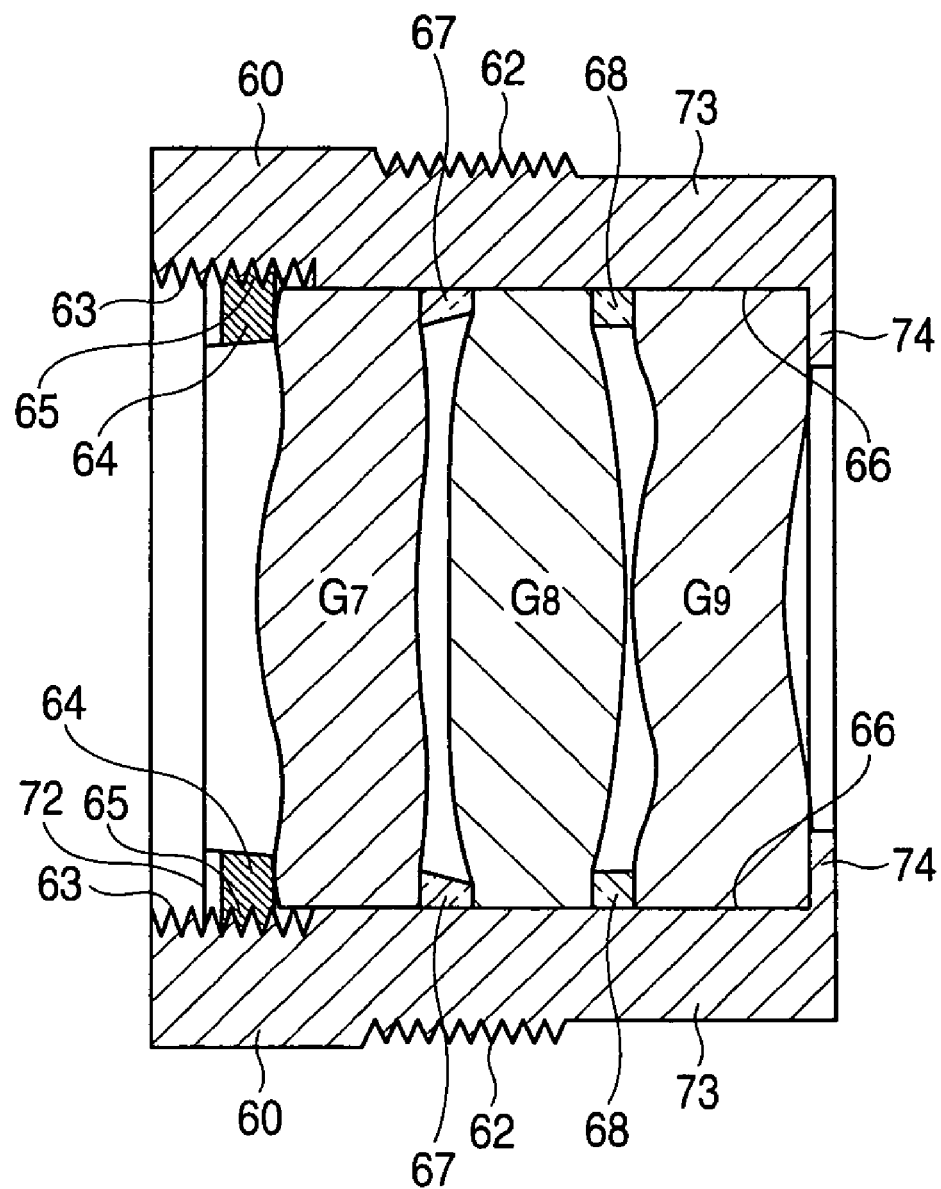
FIG. 11 is a longitudinal sectional view illustrating a lens unit according to a sixth embodiment of the invention in which the far-infrared lens according to the third embodiment and a spacer are provided in a lens barrel and a lens presser is fixed to the lens barrel.

A Lens Unit Configured to Include Three Lenses (FIG. 11)

A lens unit is formed by using a set of far-infrared lenses according to the third embodiment. A side surface view and a perspective view of the lens unit are almost the same as those shown in FIGS. 7 and 8. A longitudinal sectional view of the lens unit is shown in FIG. 11.

A lens barrel 60, which is formed of metal and has a cylindrical shape, has a male thread strip 62 at the middle position of an outer peripheral surface and a female thread portion 63 positioned at the front of an inner peripheral surface. The inner peripheral surface of the lens barrel 60 has a smooth inner tubular surface 66 positioned at middle and rear portions thereof. A locking protrusion 74 that protrudes inward is provided at a last side of the inner peripheral surface. The front side of the male thread strip 62 positioned in the middle of the outer periphery is a smooth surface portion having a large diameter. A smooth portion 73 having a smaller diameter than the male thread strip 62 is provided behind the male thread strip 62.

A lens presser 64, which is formed of metal and has a ring shape, has a male thread portion 65 in the outer periphery thereof. The male thread portion 65 can be screwed to the female thread portion 63 of the lens barrel 60. Notches 72 located in a line in the diameter direction are provided ahead of the lens presser 64. The lens presser 64 is attached to or detached from the lens barrel 60 by inserting a fixture in the notches 72 and turning the lens presser 64 around a central axis. The lens barrel 60 and the lens presser 64 can be formed of aluminum, for example.

The third lens G9, a second spacer 68, the second lens G8, a first spacer 67, and the first lens G7 are inserted along the inner tubular surface 66 of the lens barrel 60 sequentially from the back. A rear surface of the third lens G9 is pressed by the locking protrusion 74 located at the last end. The position of the third lens G9 in the axial direction thereof is determined. The second spacer 68 has an approximately cylindrical shape and is inserted between the third lens G9 and the second lens G8 such that the relative position between the second and third lenses G8 and G9 is determined. The first spacer 67 is positioned between the second lens G8 and the first lens G7 such that the relative position between the first and second lenses G7 and G8 is determined. The male thread portion 65 of the lens presser 64 is screwed to the front female thread portion 63 of the lens barrel 60 to thereby press a front portion of the first lens G7. The lens presser 64 can be screwed and fixed to the lens barrel 60 by inserting a fixture in the notch 72 and turning the fixture to the right. The lens presser 64 can be removed from the lens barrel 60 by turning the fixture to the left.

The spacers 67 and 68 are formed in a ring shape by using aluminum, ceramics, plastics, and the like.

Seventh Embodiment

Figure 12:
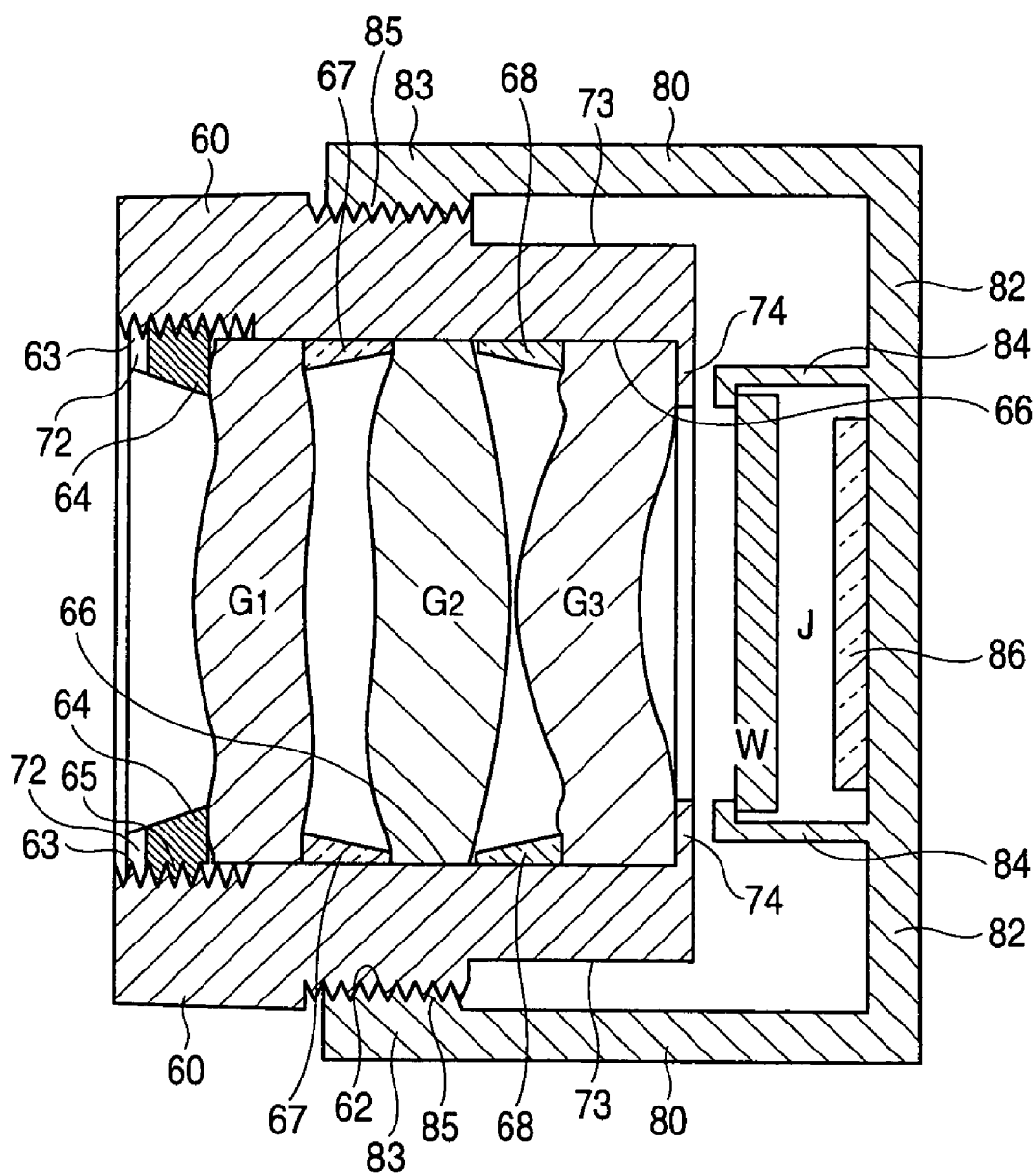
FIG. 12 is a longitudinal sectional view illustrating an imaging apparatus according to a seventh embodiment of the invention in which an imaging device is combined with the lens unit according to the fourth embodiment.

Imaging Apparatus in which an Imaging Device is Combined with a Lens Unit Including Three Lenses (FIG. 12)

In a seventh embodiment, an imaging apparatus is formed by combining an imaging device with the far-infrared lens unit according to the fourth embodiment. A longitudinal sectional view of the entire imaging apparatus according to the seventh embodiment is shown in FIG. 12.

A lens barrel 60, which is formed of metal and has a cylindrical shape, has a male thread strip 62 at the middle position of an outer peripheral surface and a female thread portion 63 positioned at the front of an inner peripheral surface. The inner peripheral surface of the lens barrel 60 has a smooth inner tubular surface 66 positioned at middle and rear portions thereof. A locking protrusion 74 that protrudes inward is provided at a last side of the inner peripheral surface. The front side of the male thread strip 62 positioned in the middle of the outer periphery is a smooth surface portion having a large diameter. A smooth portion 73 having a smaller diameter than the male thread strip 62 is provided behind the male thread strip 62.

A lens presser 64, which is formed of metal and has a ring shape, has a male thread portion 65 in the outer periphery thereof. The male thread portion 65 can be screwed to the female thread portion 63 of the lens barrel 60. Notches 72 located in a line in the diameter direction are provided ahead of the lens presser 64. The lens presser 64 is attached to or detached from the lens barrel 60 by inserting a fixture in the notches 72 and turning the lens presser 64 around a central axis. The lens barrel 60 and the lens presser 64 can be formed of aluminum, for example.

The third lens G3, the second spacer 68, the second lens G2, the first spacer 67, and the first lens G1 are inserted along the inner tubular surface 66 of the lens barrel 60 sequentially from the back. A rear surface of the third lens G3 is pressed by the locking protrusion 74 located at the last end. The position of the third lens G3 in the axial direction thereof is determined. The second spacer 68 has an approximately cylindrical shape and is inserted between the third lens G3 and the second lens G2 such that the relative position between the second and third lenses G2 and G3 is determined. The first spacer 67 is positioned between the second lens G2 and the first lens G1 such that the relative position between the first and second lenses G1 and G2 is determined. The male thread portion 65 of the lens presser 64 is screwed to the front female thread portion 63 of the lens barrel 60 to thereby press a front portion of the first lens G1. The lens presser 64 can be screwed and fixed to the lens barrel 60 by inserting a fixture in the notch 72 and turning the fixture to the right. The lens presser 64 can be removed from the lens barrel 60 by turning the fixture to the left.

By operations of the spacers 67 and 68, a distance between the first and second lenses G1 and G2 is set to 1.8382 mm and a distance between the second and third lenses G2 and G3 is set to 0.1000 mm. The spacers 67 and 68 are formed in a ring shape by using aluminum, ceramics, plastics, and the like.

An imaging device holder 80 having a bottomed cylindrical shape has a bottom plate 82 in the back and has a female thread portion 85 on an inner side surface of a front opening 83. On the bottom plate 82, a cylindrical window holder 84 having an opening is formed inward in the concentric shape. The window W is fixed to the opening of the window holder 84. An imaging device chip 86 is fixed to a middle portion of the bottom plate 82. A front surface of the imaging device chip 86 is the image surface J. The female thread portion 85 is screwed to the male thread strip 62 positioned in the middle of the outer periphery of the lens barrel 60. In this manner, the imaging apparatus in which the imaging device and the lens unit are integrally formed is obtained.

Eight Embodiment

Figure 13:
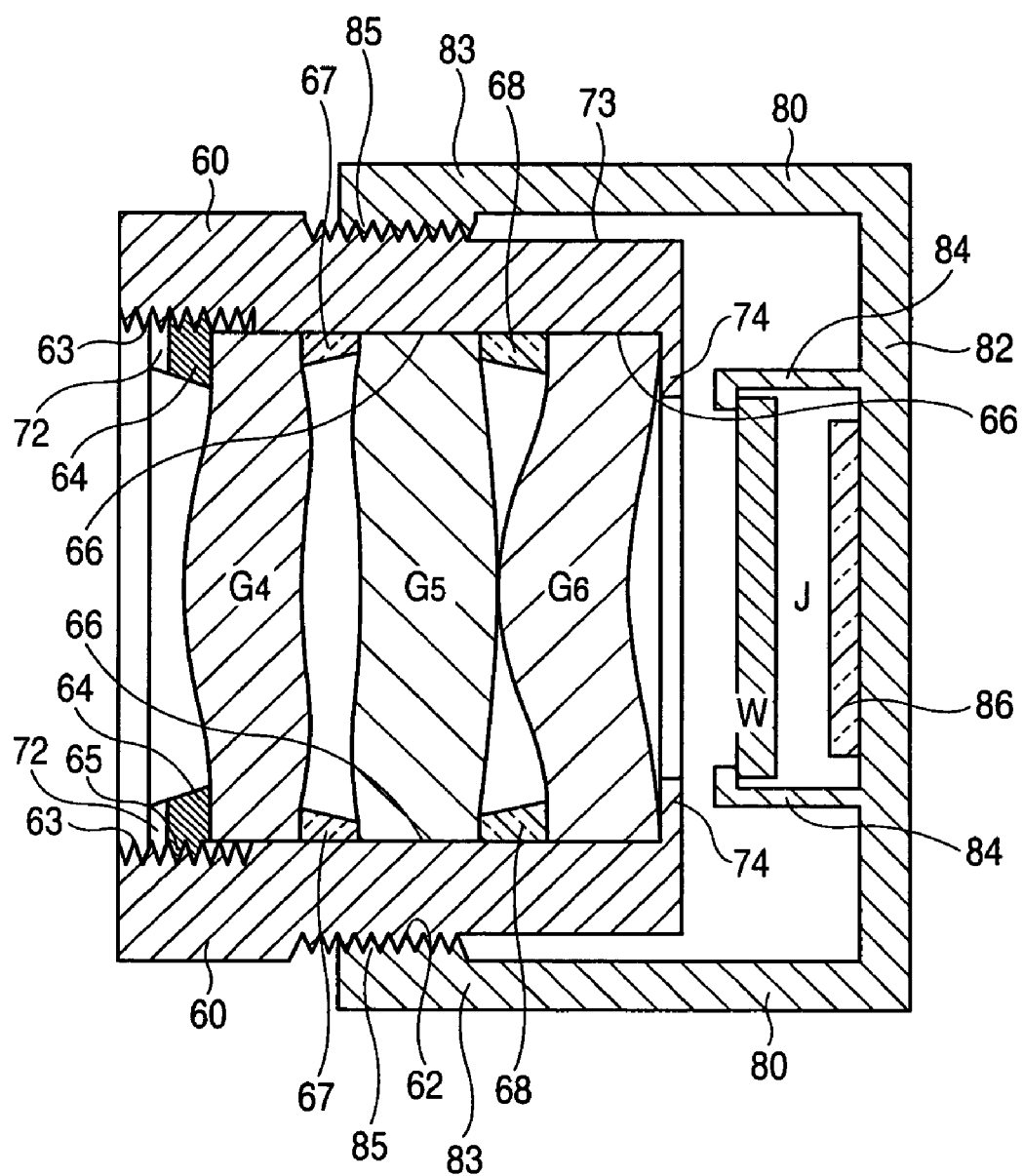
FIG. 13 is a longitudinal sectional view illustrating an imaging apparatus according to an eighth embodiment of the invention in which an imaging device is combined with the lens unit according to the fifth embodiment.

Imaging Apparatus in which an Imaging Device is Combined with a Lens Unit Including Three Lenses (FIG. 13)

In an eighth embodiment, an imaging apparatus is formed by combining an imaging device with the far-infrared lens unit according to the fifth embodiment. A longitudinal sectional view of the entire imaging apparatus according to the eighth embodiment is shown in FIG. 13.

A lens barrel 60, which is formed of metal and has a cylindrical shape, has a male thread strip 62 at the middle position of an outer peripheral surface and a female thread portion 63 positioned at the front of an inner peripheral surface. The inner peripheral surface of the lens barrel 60 has a smooth inner tubular surface 66 positioned at middle and rear portions thereof. A locking protrusion 74 that protrudes inward is provided at a last side of the inner peripheral surface. The front side of the male thread strip 62 positioned in the middle of the outer periphery is a smooth surface portion having a large diameter. A smooth portion 73 having a smaller diameter than the male thread strip 62 is provided behind the male thread strip 62.

A lens presser 64, which is formed of metal and has a ring shape, has a male thread portion 65 in the outer periphery thereof. The male thread portion 65 can be screwed to the female thread portion 63 of the lens barrel 60. Notches 72 located in a line in the diameter direction are provided ahead of the lens presser 64. The lens presser 64 is attached to or detached from the lens barrel 60 by inserting a fixture in the notches 72 and turning the lens presser 64 around a central axis. The lens barrel 60 and the lens presser 64 can be formed of aluminum, for example.

The third lens G6, the second spacer 68, the second lens G5, the first spacer 67, and the first lens G4 are inserted along the inner tubular surface 66 of the lens barrel 60 sequentially from the back. A rear surface of the third lens G6 is pressed by the locking protrusion 74 located at the last end. The position of the third lens G6 in the axial direction thereof is determined. The second spacer 68 has an approximately cylindrical shape and is inserted between the third lens G6 and the second lens G5 such that the relative position between the second and third lenses G5 and G6 is determined. The first spacer 67 is positioned between the second lens G5 and the first lens G4 such that the relative position between the first and second lenses G4 and G5 is determined. The male thread portion 65 of the lens presser 64 is screwed to the front female thread portion 63 of the lens barrel 60 to thereby press a front portion of the first lens G4. The lens presser 64 can be screwed and fixed to the lens barrel 60 by inserting a fixture in the notch 72 and turning the fixture to the right. The lens presser 64 can be removed from the lens barrel 60 by turning the fixture to the left.

The spacers 67 and 68 are formed in a ring shape by using aluminum, ceramics, plastics, and the like.

An imaging device holder 80 having a bottomed cylindrical shape has a bottom plate 82 in the back and has a female thread portion 85 on an inner side surface of a front opening 83. On the bottom plate 82, a cylindrical window holder 84 having an opening is formed inward in the concentric shape. The window W is fixed to the opening of the window holder 84. An imaging device chip 86 is fixed to a middle portion of the bottom plate 82. A front surface of the imaging device chip 86 is the image surface J. The female thread portion 85 is screwed to the male thread strip 62 positioned in the middle of the outer periphery of the lens barrel 60. In this manner, the imaging apparatus in which the imaging device and the lens unit are integrally formed is obtained.

Ninth Embodiment

Figure 14:
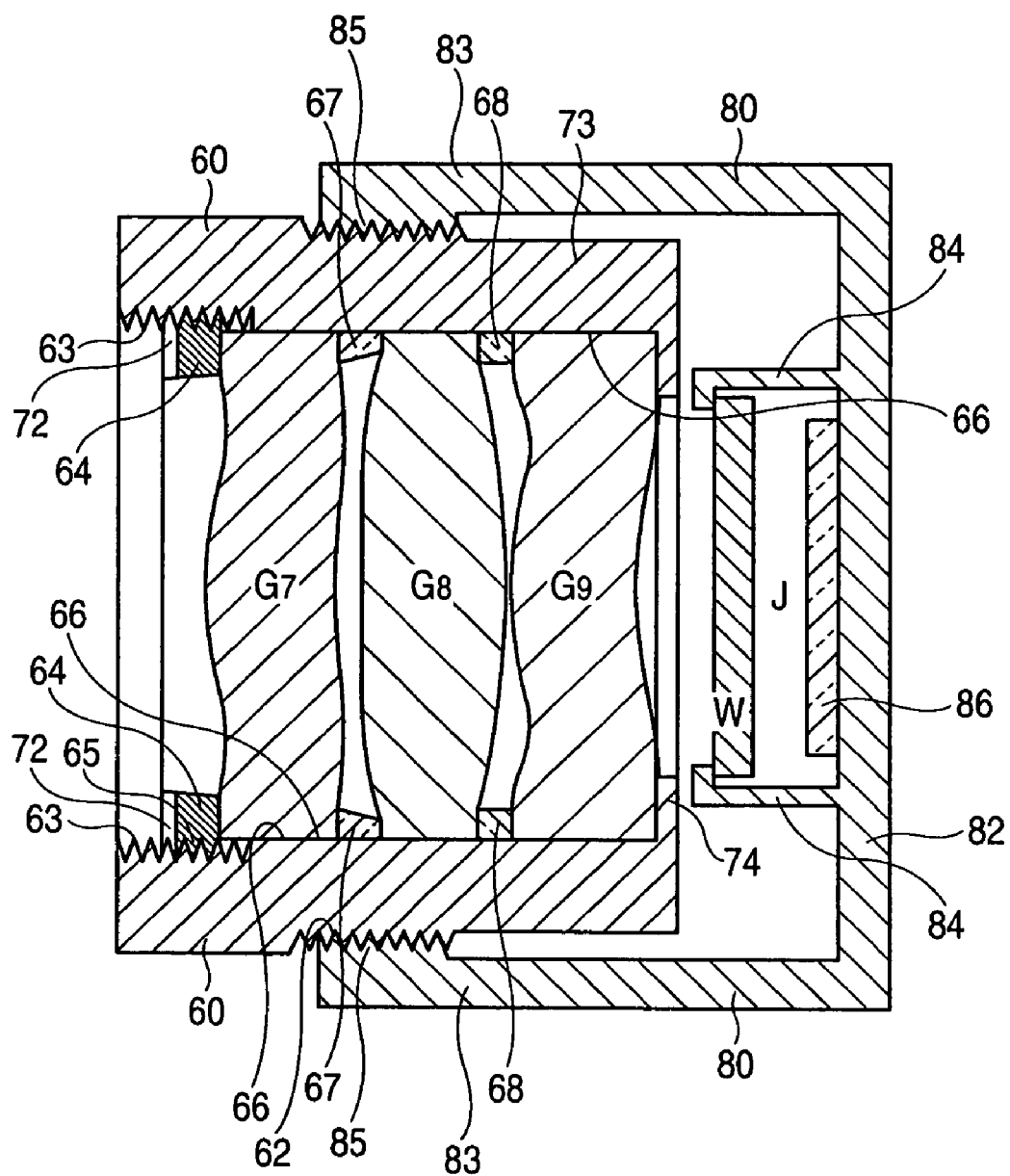
FIG. 14 is a longitudinal sectional view illustrating an imaging apparatus according to a ninth embodiment of the invention in which an imaging device is combined with the lens unit according to the sixth embodiment.

Imaging Apparatus in which an Imaging Device is Combined with a Lens Unit Including Three Lenses (FIG. 14)

In a ninth embodiment, an imaging apparatus is formed by combining an imaging device with the far-infrared lens unit according to the sixth embodiment. A longitudinal sectional view of the entire imaging apparatus according to the ninth embodiment is shown in FIG. 14.

A lens barrel 60, which is formed of metal and has a cylindrical shape, has a male thread strip 62 at the middle position of an outer peripheral surface and a female thread portion 63 positioned at the front of an inner peripheral surface. The inner peripheral surface of the lens barrel 60 has a smooth inner tubular surface 66 positioned at middle and rear portions thereof. A locking protrusion 74 that protrudes inward is provided at a last side of the inner peripheral surface. The front side of the male thread strip 62 positioned in the middle of the outer periphery is a smooth surface portion having a large diameter. A smooth portion 73 having a smaller diameter than the male thread strip 62 is provided behind the male thread strip 62.

A lens presser 64, which is formed of metal and has a ring shape, has a male thread portion 65 in the outer periphery thereof. The male thread portion 65 can be screwed to the female thread portion 63 of the lens barrel 60. Notches 72 located in a line in the diameter direction are provided ahead of the lens presser 64. The lens presser 64 is attached to or detached from the lens barrel 60 by inserting a fixture in the notches 72 and turning the lens presser 64 around a central axis. The lens barrel 60 and the lens presser 64 can be formed of aluminum, for example.

The third lens G9, the second spacer 68, the second lens G8, the first spacer 67, and the first lens G7 are inserted along the inner tubular surface 66 of the lens barrel 60 sequentially from the back. A rear surface of the third lens G9 is pressed by the locking protrusion 74 located at the last end. The position of the third lens G9 in the axial direction thereof is determined. The second spacer 68 has an approximately cylindrical shape and is inserted between the third lens G9 and the second lens G8 such that the relative position between the second and third lenses G8 and G9 is determined. The first spacer 67 is positioned between the second lens G8 and the first lens G7 such that the relative position between the first and second lenses G7 and G8 is determined. The male thread portion 65 of the lens presser 64 is screwed to the front female thread portion 63 of the lens barrel 60 to thereby press a front portion of the first lens G7. The lens presser 64 can be screwed and fixed to the lens barrel 60 by inserting a fixture in the notch 72 and turning the fixture to the right. The lens presser 64 can be removed from the lens barrel 60 by turning the fixture to the left.

The spacers 67 and 68 are formed in a ring shape by using aluminum, ceramics, plastics, and the like.

An imaging device holder 80 having a bottomed cylindrical shape has a bottom plate 82 in the back and has a female thread portion 85 on an inner side surface of a front opening 83. On the bottom plate 82, a cylindrical window holder 84 having an opening is formed inward in the concentric shape. The window W is fixed to the opening of the window holder 84. An imaging device chip 86 is fixed to a middle portion of the bottom plate 82. A front surface of the imaging device chip 86 is the image surface J. The female thread portion 85 is screwed to the male thread strip 62 positioned in the middle of the outer periphery of the lens barrel 60. In this manner, the imaging apparatus in which the imaging device and the lens unit are integrally formed is obtained.

The embodiments described above are only illustrative at all points and should be considered not to be restrictive. The invention is not limited to the above-described embodiments, but all kinds of changes may be made without departing from the subject matter or spirit of the invention defined by the appended claims and their equivalents.

What is claimed is:

1. A far-infrared camera lens comprising:
a first lens that is formed of ZnS and has a middle portion that is a meniscus, which is convex on an object side and concave on an image surface side, and a peripheral portion, which is concave on the object side and convex on the image surface side;
a second lens that is formed of ZnS and has a middle portion that is a meniscus, which is concave on an object side and has positive refractive power, and a peripheral portion, which is convex on the object side; and
a third lens that is formed of ZnS, is provided adjacent to the second lens, and has a middle portion which has a convex meniscus shape on an object side and a peripheral portion which is concave on the object side, wherein
a diffraction surface is formed in either lens surface of at least one of the first lens, the second lens, or the third lens, and
a viewing angle is 50° to 70°.

2. The far-infrared camera lens according to claim 1, wherein
the third lens is provided adjacent to the second lens with a distance therebetween 1 mm or less.

3. The far-infrared camera lens according to claim 1, wherein
a total focal distance f is 6 mm to 11 mm, and
a focal distance $f_{12}$ of only the first and second lenses is 5 mm to 18 mm.

4. The far-infrared camera lens according to claim 1, wherein
when the total focal distance of the three lenses is f, the focal distance of only the first and second lenses is $f_{12}$, $0.9 \leq f_{12}/f \leq 1.6$.

5. The far-infrared camera lens according to claim 1, wherein
the first, second, and third lenses formed of ZnS are manufactured by molding ZnS raw powder by heat compression using a lens-shaped mold.

6. The far-infrared camera lens according to claim 1, wherein
in all of the first, second, and third lenses,
sag amount<5 mm,
1.5 mm<central thickness<8 mm, and
1 mm<edge thickness<8 mm.

7. A lens unit using the lens according to claim 1.

8. An imaging apparatus comprising:
the lens unit according to claim 7; and
an imaging unit that images an image formed on the lens unit.

9. The far-infrared camera lens according to claim 1, wherein
the first lens is located at a first distance from an image plane,
the second lens is located at a second distance from the image plane, the second distance being smaller than the first distance, and
the third lens is located at a third distance from the image plane, the third distance being smaller than the second distance.

* * * * *